United States Patent
Niwata et al.

(10) Patent No.: US 8,646,058 B2
(45) Date of Patent: Feb. 4, 2014

(54) COMPUTER SYSTEM AND ACCESS RIGHT SETTING METHOD

(75) Inventors: Syouzou Niwata, Tokyo (JP); Yoshihiro Yano, Tokyo (JP); Takayuki Chikada, Tokyo (JP); Fukio Handa, Tokyo (JP); Kazutoshi Kichikawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1447 days.

(21) Appl. No.: 10/588,324

(22) PCT Filed: Jan. 20, 2005

(86) PCT No.: PCT/JP2005/001041
§ 371 (c)(1),
(2), (4) Date: Aug. 3, 2006

(87) PCT Pub. No.: WO2005/081120
PCT Pub. Date: Sep. 1, 2005

(65) Prior Publication Data
US 2008/0276307 A1    Nov. 6, 2008

(30) Foreign Application Priority Data
Feb. 23, 2004    (JP) .................................. 2004-045974

(51) Int. Cl.
*G06F 7/04*    (2006.01)
(52) U.S. Cl.
USPC ..................... 726/9; 726/6; 726/20; 726/27
(58) Field of Classification Search
None
See application file for complete search history.

(56) References Cited

U.S. PATENT DOCUMENTS

| | | | | |
|---|---|---|---|---|
| 6,668,322 B1 * | 12/2003 | Wood et al. | .................... | 713/182 |
| 6,990,592 B2 * | 1/2006 | Richmond et al. | .............. | 726/15 |
| 7,346,556 B2 * | 3/2008 | Upendran et al. | ......... | 705/26.41 |
| 7,458,093 B2 * | 11/2008 | Dukes et al. | .................. | 725/141 |
| 7,904,952 B2 * | 3/2011 | Yeap et al. | ...................... | 726/12 |
| 2002/0100037 A1 | 7/2002 | Kitagawa | | |

FOREIGN PATENT DOCUMENTS

| | | |
|---|---|---|
| JP | 4-62636 | 2/1992 |
| JP | 4-252350 | 9/1992 |
| JP | 7-191940 A | 7/1995 |
| JP | 11-328120 | 11/1999 |

(Continued)

OTHER PUBLICATIONS esp@cenet Abstract of JP 2000-330668A.

(Continued)

*Primary Examiner* — Kaveh Abrishamkar
(74) *Attorney, Agent, or Firm* — Ladas & Parry LLP

(57) ABSTRACT

IC cards (R11, R12, and R21) are issued respectively to users α, β, and γ. An identification code (ID(11)) of a computer (11) supplied to user α and environment information (ENV(11)) that indicates a normal network environment of the computer (11) are recorded in the IC card (R11) issued to user α. When in order to use a computer, a user connects his/her IC card, the identification code and the network environment of the computer to be used are compared with the identification code and environment information recorded in the IC card and different access rights are provided in accordance to the degree of matching. The identification code may be a MAC address of a LAN circuit incorporated in the computer, and the environment information may be a default gateway address or the like. Different access rights can thus be set according to the computer or the network environment that is used.

28 Claims, 9 Drawing Sheets

(56) References Cited

FOREIGN PATENT DOCUMENTS

| | | |
|---|---|---|
| JP | 2000-10930 | 1/2000 |
| JP | 2000-90038 | 3/2000 |
| JP | 2000-250860 A | 9/2000 |
| JP | 2000-330668 A | 11/2000 |
| JP | 2002-518720 A | 6/2002 |
| JP | 2002-215254 | 7/2002 |
| JP | 2003-122635 | 4/2003 |
| JP | 2004-46460 | 2/2004 |
| WO | 99/65207 | 12/1999 |

OTHER PUBLICATIONS esp@cenet Abstract of JP 2000-250860A.

* cited by examiner

COMPUTER SYSTEM AND ACCESS RIGHT SETTING METHOD

TECHNICAL FIELD

This invention concerns a computer system and an access right setting method and particularly concerns an art for ensuring security in accessing to server computers from client computers via a network.

BACKGROUND ART

Presently, computers are generally used while being connected to each other via networks, and networks that incorporate hubs, LAN switches, routers, etc., have come to be constructed not only in companies but also in general households. Also generally in a company, a dedicated network, such as an intra-company LAN or WAN is constructed and server computers with various functions that suit the forms of business of respective departments are used upon being connected to this network. Individual employees connect personal computers or other client computers to the network and perform work while carrying out transactions of data with the server computers.

Security management is extremely important in operating a computer system using such a network. That is, not only must the respective computers connected to the network be protected against unauthorized access by external hackers but also operation, of a form wherein even employees belonging to the same company are respectively subject to unique access restrictions that are in accordance to each employee's department and job responsibilities, is essential.

Various security management arts have thus been proposed for computer systems using networks. For example, Japanese Unexamined Patent Publication No. 2000-10930 and Japanese Unexamined Patent Publication No. 2003-122635 disclose arts for managing unique access rights according to each individual user in a computer system wherein client computers and server computers are connected via a network.

Conventional security management methods, including the arts disclosed in the aforementioned patent publications, are based on a basic concept of setting predetermined access rights according to each individual user. That is, in a generally implemented form of operation, each user is provided with a predetermined account (username) and a password, predetermined access rights are set for each individual account, and when a login procedure by a specific account is performed, the password is verified to confirm that the login procedure is legitimate and then access within the access right range set for that account is enabled.

Although the basic policy of setting specific access rights according to each individual user is extremely rational from a broad perspective, many recent situations, wherein the contents of business forms using a computer system are becoming more and more complex, cannot necessarily be accommodated just by such a basic policy. In particular, with a company with a large number of employees, the existence of employees who will perform an illicit act cannot be denied completely and it is thus dangerous to completely trust individual employees and provide the same access right unconditionally under all circumstances.

An object of this invention is to provide a computer system that enables different access rights to be set for individual users according to circumstances (according to the computers and network environment used).

DISCLOSURE OF INVENTION (1) The first feature of the present invention resides in a computer system comprising: a network; a server computer connected to the network; a plurality of client computers connectable to the network; and portable information recording media issued respectively to individual users for use upon connection to the client computers; wherein a unique identification code is recorded in each of the client computers so as to enable distinction from other client computers, an identification code that corresponds to a specific identification code recorded in a specific client computer is recorded in each of the portable information recording media, and each of the client computers comprises an interface means for connecting a portable information recording medium, an identification code comparing means that compares an identification code recorded in a currently connected portable information recording medium and an identification code recorded in itself, an access right setting means that sets a predetermined access right based on a comparison result, and a server access means that performs access to the server computer within a range of the access right that has been set.

(2) The second feature of the present invention resides in a computer system comprising: a network; a server computer connected to the network; a plurality of client computers connectable to the network; and portable information processing devices issued respectively to individual users for use upon connection to the client computers; wherein a unique identification code is recorded in each of the client computers so as to enable distinction from other client computers, an identification code that corresponds to a specific identification code recorded in a specific client computer is recorded in each of the portable information processing devices, each of the client computers comprises an interface means for connecting a portable information processing device, and a server access means that performs access to the server computer within a range of an access right that is transmitted from a currently connected portable information processing device, and each of the portable information processing devices comprises an identification code comparing means that compares an identification code recorded in a currently connected client computer and an identification code recorded in itself, an access right setting means that sets a predetermined access right based on a comparison result, and an access right transmitting means that transmits, to the currently connected client computer, the access right that has been set.

(3) The third feature of the present invention resides in a computer system according to the first or second feature, wherein the access right setting means sets a first access right when the comparison result indicates matching and sets a second access right, with more restrictions than the first access right, when the comparison result indicates mismatching.

(4) The fourth feature of the present invention resides in a computer system according to the first to third features, wherein a MAC address provided to a LAN communication circuit incorporated in a client computer, unique data stored in a storage device of the client computer, or information indicating an arrangement of application programs stored in a storage device of the client computer is used as a unique identification code for identifying the client computer.

(5) The fifth feature of the present invention resides in a computer system comprising: a network; a server computer connected to the network; a plurality of client computers connectable to the network; and portable information recording media issued respectively to individual users for use upon connection to the client computers; wherein environment information that indicates a specific network environment that is obtained when a client computer is connected to a specific location of the network is recorded in each of the portable information recording media, and each of the client computers comprises an interface means for connecting a portable information recording medium, an environment comparing means that compares a network environment indicated by environment information recorded in a currently connected portable information recording medium and a current network environment of itself, an access right setting means that sets a predetermined access right based on a comparison result, and a server access means that performs access to the server computer within a range of the access right that has been set.

(6) The sixth feature of the present invention resides in a computer system comprising: a network; a server computer connected to the network; a plurality of client computers connectable to the network; and portable information processing devices issued respectively to individual users for use upon connection to the client computers; wherein environment information that indicates a specific network environment that is obtained when a client computer is connected to a specific location of the network is recorded in each of the portable information processing devices, each of the client computers comprises an interface means for connecting a portable information processing device, and a server access means that performs access to the server computer within a range of an access right that is transmitted from a currently connected portable information processing device, and each of the portable information processing devices comprises an environment comparing means that compares a network environment of a currently connected client computer and a network environment indicated by environment information recorded in itself, an access right setting means that sets a predetermined access right based on a comparison result, and an access right transmitting means that transmits, to the currently connected client computer, the access right that has been set.

(7) The seventh feature of the present invention resides in a computer system according to the fifth or sixth feature, wherein the access right setting means sets a first access right when the comparison result indicates matching and sets a second access right, with more restrictions than the first access right, when the comparison result indicates mismatching.

(8) The eighth feature of the present invention resides in a computer system according to the fifth to seventh features, wherein an IP address provided to a client computer, a default gateway address set for the client computer, a proxy server address set for the client computer, or a domain name which can be referred by a DNS server used by the client computer is used as environment information that indicates a network environment of the client computer.

(9) The ninth feature of the present invention resides in a computer system comprising: a network; a server computer connected to the network; a plurality of client computers connectable to the network; and portable information recording media issued respectively to individual users for use upon connection to the client computers; wherein a unique identification code is recorded in each of the client computers so as to enable distinction from other client computers, an identification code that corresponds to a specific identification code recorded in a specific client computer and environment information that indicates a specific network environment that is obtained when a client computer is connected to a specific location of the network are recorded in each of the portable information recording media, and each of the client computers comprises an interface means for connecting a portable information recording medium, an identification code comparing means that compares an identification code recorded in a currently connected portable information recording medium and an identification code recorded in itself, an environment comparing means that compares a network environment indicated by environment information recorded in a currently connected portable information recording medium and a current network environment of itself, an access right setting means that sets a predetermined access right based on comparison results, and a server access means that performs access to the server computer within a range of the access right that has been set.

(10) The tenth feature of the present invention resides in a computer system comprising: a network; a server computer connected to the network; a plurality of client computers connectable to the network; and portable information processing devices issued respectively to individual users for use upon connection to the client computers; wherein a unique identification code is recorded in each of the client computers so as to enable distinction from other client computers, an identification code that corresponds to a specific identification code recorded in a specific client computer and environment information that indicates a specific network environment that is obtained when a client computer is connected to a specific location of the network are recorded in each of the portable information processing devices, each of the client computers comprises an interface means for connecting a portable information processing device, and a server access means that performs access to the server computer within a range of an access right that is transmitted from a currently connected portable information processing device, and each of the portable information processing devices comprises an identification code comparing means that compares an identification code recorded in a currently connected client computer and an identification code recorded in itself, an environment comparing means that compares a network environment of the currently connected client computer and a network environment indicated by environment information recorded in itself, an access right setting means that sets a predetermined access right based on comparison results, and an access right transmitting means that transmits, to the currently connected client computer, the access right that has been set.

(11) The eleventh feature of the present invention resides in a computer system according to the ninth or tenth feature, wherein the access right setting means sets a first access right when the result of comparison by the identification code comparing means indicates matching, sets a second access right, with more restrictions than the first access right, when the result of comparison by the identification code comparing means indicates mismatching but the result of comparison by the environment comparing means indicates matching, and sets a third access right, with even more restrictions than the second access right, when neither of the comparison results indicates matching.

(12) The twelfth feature of the present invention resides in a computer system according to the ninth or tenth feature, wherein the access right setting means sets a first access right when both the result of comparison by the identification code comparing means and the result of comparison by the environment comparing means indicate matching, sets a second access right, with more restrictions than the first access right, when the result of comparison by the identification code comparing means indicates matching but the result of comparison by the environment comparing means indicates mismatching, and sets a third access right, with even more restrictions than the second access right, when neither of the comparison results indicates matching.

(13) The thirteenth feature of the present invention resides in an access right setting method for a computer system comprising: a network; a server computer connected to the network; and a plurality of client computers connectable to the network; the method setting an access right when each individual, user uses a client computer to access the server computer and comprising:

a preparation step, wherein a portable information processing device, to be used by connecting to a client computer, is issued to each individual user, and an identification code, corresponding to a unique identification code that is recorded in a specific client computer and enables distinction of the specific client computer from other client computers, is recorded in the portable information processing device; and an access right setting step, wherein when a user connects a predetermined portable information processing device, issued to him/herself, to a predetermined client computer and performs a login procedure on the predetermined client computer, the predetermined client computer or the predetermined portable information processing device is made to compare an identification code recorded in the predetermined client computer with an identification code recorded in the predetermined portable information processing device and set a predetermined access right based on a comparison result;

wherein when in the access right setting step, the comparison result indicates mismatching, an access right with more restrictions than when the comparison result indicates matching is set.

(14) The fourteenth feature of the present invention resides in an access right setting method for a computer system comprising: a network; a server computer connected to the network; and a plurality of client computers connectable to the network; the method setting an access right when each individual user uses a client computer to access the server computer and comprising:

a preparation step, wherein a portable information processing device, to be used by connecting to a client computer, is issued to each individual user, and environment information that indicates a specific network environment that is obtained when a client computer is connected to a specific location of the network is recorded in the portable information processing device; and an access right setting step, wherein when a user connects a predetermined portable information processing device, issued to him/herself, to a predetermined client computer and performs a login procedure on the predetermined client computer, the predetermined client computer or the predetermined portable information processing device is made to compare a current network environment of the predetermined client computer with a network environment indicated by environment information recorded in the predetermined portable information processing device and set a predetermined access right based on a comparison result;

wherein when in the access right setting step, the comparison result indicates mismatching, an access right with more restrictions than when the comparison result indicates matching is set.

(15) The fifteenth feature of the present invention resides in an access right setting method for a computer system comprising: a network; a server computer connected to the network; and a plurality of client computers connectable to the network; the method setting an access right when each individual user uses a client computer to access the server computer and comprising:

a preparation step, wherein a portable information processing device, to be used by connecting to a client computer, is issued to each individual user, and an identification code, corresponding to a unique identification code that is recorded in a specific client computer and enables distinction of the specific client computer from other client computers, and environment information that indicates a specific network environment that is obtained when a client computer is connected to a specific location of the network are recorded in the portable information processing device; and an access right setting step, wherein when a user connects a predetermined portable information processing device, issued to him/herself, to a predetermined client computer and performs a login procedure on the predetermined client computer, the predetermined client computer or the predetermined portable information processing device is made to compare an identification code recorded in the predetermined client computer with an identification code recorded in the predetermined portable information processing device, compare a current network environment of the predetermined client computer with a network environment indicated by environment information recorded in the predetermined portable information processing device, and set a predetermined access right based on comparison results;

wherein in the access right setting step, if an identification code comparison result indicates matching, a first access right is set, if the identification code comparison result indicates mismatching but a network environment comparison result indicates matching, a second access right, with more restrictions than the first access right, is set, and if neither of the comparison results indicate matching, a third access right, with even more restrictions than the second access right, is set.

(16) The sixteenth feature of the present invention resides in an access right setting method for a computer system comprising: a network; a server computer connected to the network; and a plurality of client computers connectable to the network; the method setting an access right when each individual user uses a client computer to access the server computer and comprising:

a preparation step, wherein a portable information processing device, to be used by connecting to a client computer, is issued to each individual user, and an identification code, corresponding to a unique identification code that is recorded in a specific client computer and enables distinction of the specific client computer from other client computers, and environment information that indicates a specific network environment that is obtained when a client computer is connected to a specific location of the network are recorded in the portable information processing device; and an access right setting step, wherein when a user connects a predetermined portable information processing device, issued to him/herself, to a predetermined client computer and performs a login procedure on the predetermined client computer, the predetermined client computer or the predetermined portable information processing device is made to compare an identification code recorded in the predetermined client computer with an identification code recorded in the predetermined portable information processing device, compare a current network environment of the predetermined client computer with a network environment indicated by environment information recorded in the predetermined portable information processing device, and set a predetermined access right based on comparison results;

wherein in the access right setting step, if both an identification code comparison result and a network environment comparison result indicate matching, a first access right is set, if the identification code comparison result indicates matching but the network environment comparison result indicates mismatching, a second access right, with more restrictions than the first access right, is set, and if neither of the comparison results indicate matching, a third access right, with even more restrictions than the second access right, is set.

(17) The seventeenth feature of the present invention resides in a program for making a computer function as a client computer in the computer system according to the first to twelfth features, or a computer-readable recording medium recording the program.

With this invention's computer system, since access rights can be set by recognizing that a client computer that a user is using is a specific client computer that has been prepared for that user or is in a specific network environment prepared for that user, different access rights can be set for individual users according to circumstances.

BEST MODE FOR CARRYING OUT THE INVENTION

This invention is described based on the illustrated embodiments.

Section 0

Background for Adopting this Invention

Figure 1:
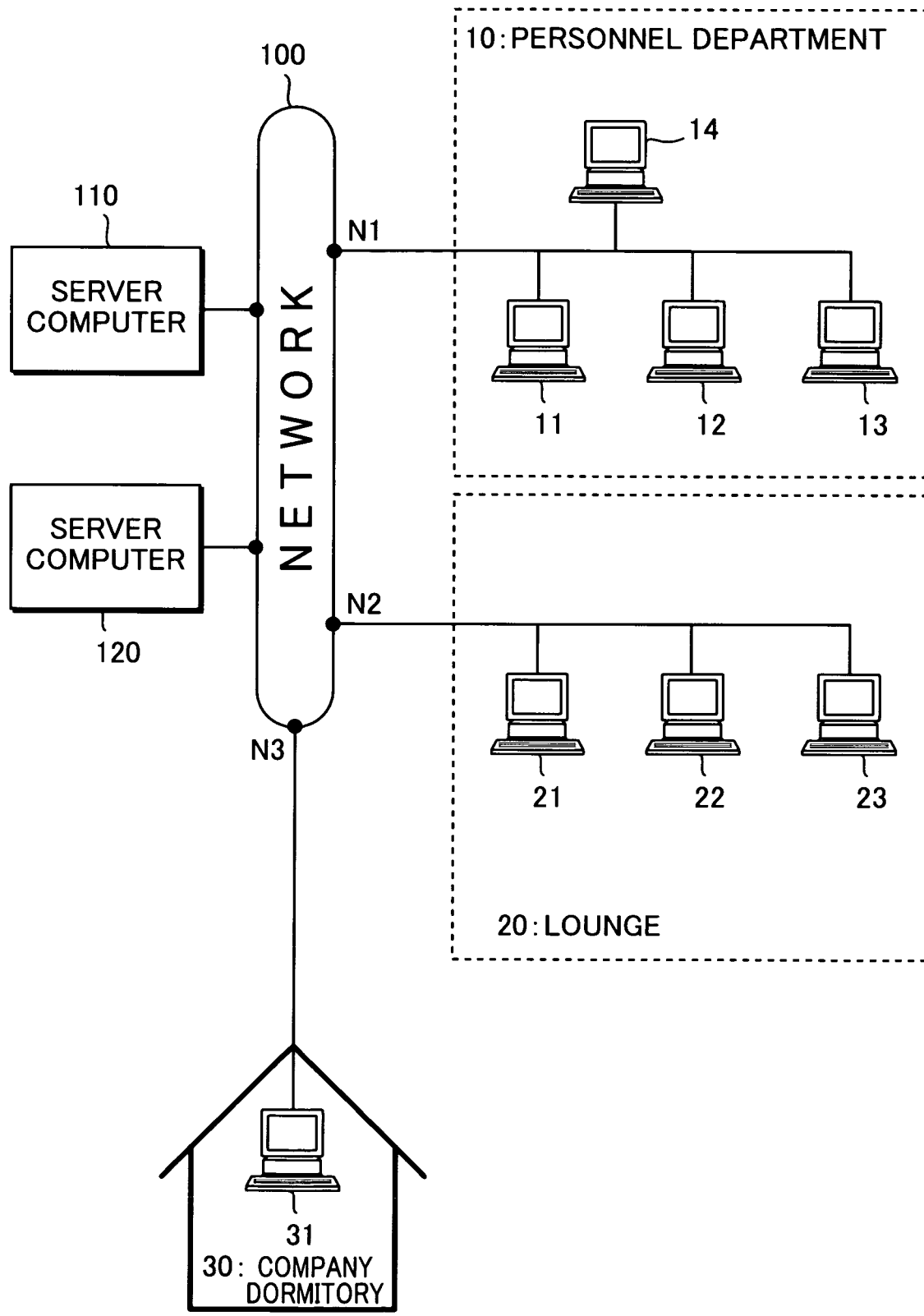
FIG. 1 is a block diagram of a general computer system that is arranged by connecting server computers and client computers to a network.

First, the background for adopting this invention will be described with reference to the example shown in FIG. 1. FIG. 1 is a block diagram of a computer system model arranged by connecting two server computers 110 and 120 and eight client computers 11, 12, 13, 14, 21, 22, 23, and 31 to a network 100. Although a larger number of server computers and a larger number of client computers are normally used in a computer system that is used in a general company, the illustrated simplified model shall be described here for the sake of convenience.

Network 100 is normally arranged from a plurality of routers and various wirings that connect the routers. Although there are generally various network forms, such as LAN, WAN, Internet, etc., network 100 may arranged from any of such forms. Also, although in the figure, network 100 and respective client computers are connected by lines, these do not necessarily have to be wire-connected and a wireless LAN may be used instead.

Here, for the sake of description, it shall be deemed that this computer system is used in a single company, that client computers 11, 12, 13, and 14 are installed in a personnel department 10 of the company, that client computers 21, 22, and 23 are installed in a lounge 20 of this company, and that client computer 31 is installed in a room of a company dormitory 30 of this company. Furthermore, one employee belonging to the personnel department shall be referred to user a and it shall be deemed that client computer 11 is installed on a desk of user a inside personnel department 10. That is, client computer 11 is supplied to user a from the company and user α performs daily business by operating client computer 11 while sitting at his/her own desk.

Meanwhile, various data for the business of this company are accumulated in server computers 110 and 120 and each individual employee accesses server computers 110 and 120 from a client computer as necessary to perform such processes as reading, writing, and modifying necessary data. Here, for the sake of description, it shall be deemed that general business data, the access to which should be permitted to all employees, are stored in server computer 110 and that exclusive business data of high confidentiality, which should be accessed only by employees belonging to specific departments, are stored in server computer 120.

Security management is obviously important in operating such a computer system. With the general, conventional security management method, the form of operation, wherein unique access rights are set for each individual employee in accordance to the employee's department and job responsibility, is implemented. In the case of the above example, an access right enabling the reading of general business data in server computer 110 and an access right enabling the reading and writing of personnel-department-exclusive business data in server computer 120 are set for user α, who is a staff member of the personnel department.

In carrying out such access right management according to user, the form of operation, wherein each individual user is provided with a predetermined account (username) and a password, predetermined access rights are set for each individual account, and when a login procedure is performed by a specific account, the password is verified to confirm that the login procedure is legitimate and then access within the access right range set for that account is enabled, is normally implemented. With the above example, when user α, who is a personnel department staff member, starts up client computer 11 that is installed on his/her desk and begins a procedure for starting use, user α is requested to perform an operation of inputting a predetermined account and a predetermined password. After the account and the password that have been input here are certified as being legitimate, user α is enabled to access server computers 110 and 120 within the range of the access right set for user α in advance.

General security management methods that have been implemented conventionally are based on the basic policy of setting a specific access right according to each individual user as in the above-described example. Obviously, on the premise that each individual employee (user) will carry out work honestly at all times, security management based on such a basic policy is extremely rational. However, with a company with a large number of employees, security management must be implemented in consideration of the possibility of illicit activities by employees as well.

For example, suppose there is an unwritten rule among the personnel department staff that "the pay slips of individual employees must not be shown to people of other departments." With the above example, since user α, who is a personnel department staff member, is given the right to access personnel-department-exclusive business data in server computer 120, user α can make the pay slips of individual employees be displayed on the screen of client computer 11 on his/her own desk and browse the data. Under these circumstances, the possibility of performing an act that will violate the above-mentioned unwritten rule will be low. In the least, since, in the room in which client computer 11 is installed, other staff of the personnel department will be working and there will be supervision by a superior, it is unlikely for one to venture to perform an act of calling a friend of another department to his/her own desk and allow the friend to browse pay slips displayed on client computer 11.

However, it can be understood that the situation will change in a case where user α is taking a break with friends in lounge 20. If user α is provided the access right of user α as they are even when he/she logs in using client computer 21 installed in lounge 20, it becomes possible to display the pay slips of individual employees even on the screen of client computer 21 installed in lounge 20. Since supervision of a superior will not extend to lounge 20, the possibility of one allowing a friend to browse pay slip information in violation of the rule will be high. Furthermore, if user α is provided the access right of user α as they are even when he/she returns to his/her own room in company dormitory 30 and logs in using client computer 31 that is installed in the room, the possibility that the rule will be broken will become even higher.

Besides the above, there are innumerable cases where the possibility of committing a rule violation increases depending on the installation environment of a client computer. For example, suppose there is an in-company rule that "personnel department staff must not store or print out personnel-department-exclusive business data in or onto an external recording medium without the permission of a personnel department manager." According to this in-company rule, a personnel department staff member is enabled to access personnel-department-exclusive business data in server computer 120 but is prohibited from storing the data in a floppy disk or CD-R or printing out the data without permission. The possibility that an act in violation of this rule will be committed using any of client computers 11 to 14 disposed in personnel department 10 will thus be low. Since an act of storing in a floppy disk or an act of printing out can be noticed readily by a supervisor or other staff, one, out of guilt, would voluntarily refrain from committing a violation. However, circumstances will differ in cases of use of any of client computers 21 to 23 disposed in lounge 20 or client computer 31 disposed in company dormitory 30.

Also with a department in which confidentiality is stressed, monitor cameras may be installed at the entrances and exits to the department and checks by security staff may be made mandatory in entering and exiting the department. With such a department, since even if confidential data are stored in a floppy disk or CD-R or are printed out, it is difficult to take the data outside the department, the possibility that a rule violation will be committed will be low. However, if the same access right is provided even in the case of using client computer 31 installed in company dormitory 30, the significance of security will be lost even if entrance and exit to and from the department is controlled strictly.

Needless to say, normally as a method of resolving such a security issue, a method of constructing a firewall is employed. With the example shown in FIG. 1, by incorporating a plurality of routers in network 100, constructing firewalls according to each individual area, and implementing a form of operation, wherein when an access to server computer 120 is made via node N2 or N3, this access is rejected, the above-mentioned illicit act can be prevented. However, complex settings concerning the network, such as setting up which type of firewall where, become necessary. This invention aims to resolve such security issues by the different approach described below.

Section 1

First Embodiment of the Invention

Figure 2:
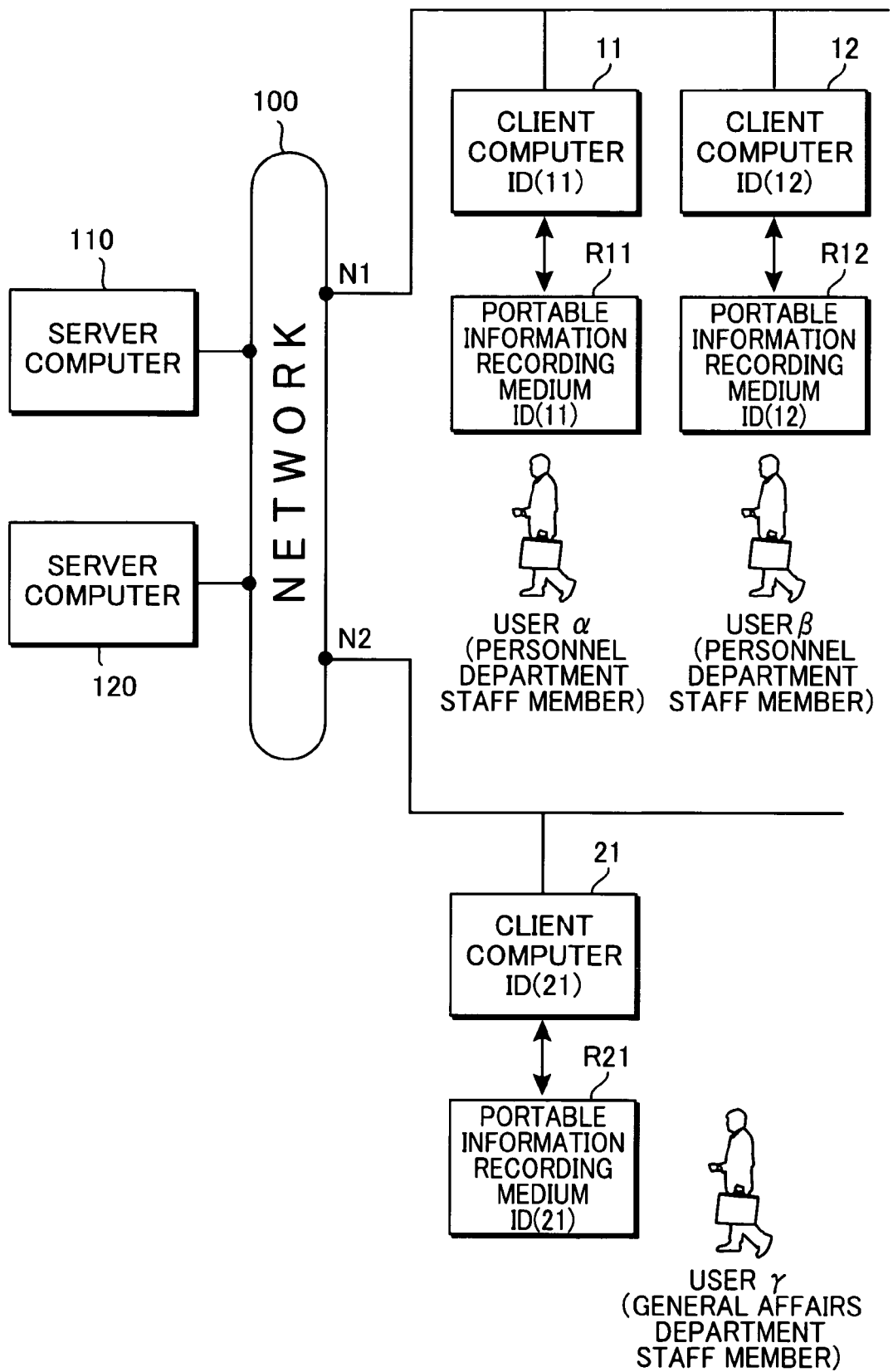
FIG. 2 is a block diagram for describing a first embodiment of this invention and shows a portion of the computer system shown in FIG. 1.

FIG. 2 is a block diagram for describing a first embodiment of this invention and shows a portion of the computer system shown in FIG. 1. A basic concept of this first embodiment is a form of operation, wherein a primary client computer is established for each individual user and whereas access according to the primary access right set for the user is enabled when a user performs access using the primary client computer, only access according to an access right with more restrictions than the primary access right set for the user is enabled when the user performs access using a client computer besides the primary client computer.

As an example, a case where three users α, β, and γ use this computer system shall be considered. Here, it shall be deemed that users α and β are both personnel department staff, and user γ is a general affairs department staff member, who manages the lounge. It shall also be deemed that user α is supplied with computer 11 as the primary client computer, user β is supplied with computer 12 as the primary client computer, and user γ is supplied with computer 21 as the primary client computer. As shown in FIG. 1, client computers 11 and 12, supplied to users α and β are installed in the room of personnel department 10 and client computer 21, supplied to user γ is installed in lounge 20.

In order to implement the security management in this invention's computer system, a portable information recording medium to be used for connecting to client computers is issued to each individual user. An example, wherein portable information recording media R11, R12, and R13 are issued to the three users α, β, and γ, respectively, is shown in FIG. 2. These portable information recording media R11, R12, and R21 may be of any form as long as these are media that can be carried readily by the respective users and have a function of recording data. However for practical use, media enabling adequate security to be ensured for recorded data are preferably used. Specifically, IC cards are used optimally as the portable information recording media. IC cards excel at portability and enable adequate security to be ensured for recorded data.

The portable information recording media do not have to be media that are exclusively for use in this invention and may be used in common with other applications. For example, companies that issue employee ID cards that make use of IC cards have been increasing recently, and in such a case, it is sufficient to use the employee ID cards as the portable information recording media. In the description that follows, it shall be deemed that portable information recording media R11, R12, and R21, shown in FIG. 2, are employee ID cards arranged from IC cards that are issued to users α, β, and γ respectively.

In the first embodiment, an identification code of a specific client computer is recorded in each of portable information recording media R11, R12, and R13. Here, the specific client computer is the primary computer to be used by the corresponding user. With the example shown in FIG. 2, an identification code ID(11) of client computer 11, which user α is to use primarily, is recorded in portable information recording medium R11 issued to user α (the IC card issued as the employee ID card of user α). Likewise, an identification code ID(12) of client computer 12, which user β is to use primarily, is recorded in portable information recording medium R12 issued to user β (the IC card issued as the employee ID card of user β), and an identification code ID(21) of client computer 21, which user γ is to use primarily, is recorded in portable information recording medium R21 issued to user γ (the IC card issued as the employee ID card of user γ).

As the identification code of a client computer, any code may be used as long as it is an identification code that is recorded in some portion inside the client computer and is a unique identification code enabling the client computer to be distinguished from other client computers.

For example, a MAC address (Media Access Control Address), provided to a LAN communication circuit incorporated in a client computer, may be used as the identification code in this invention. Each client computer is equipped with a LAN communication circuit for connecting to network 100. Presently, LAN communication circuits for Ethernet that are used as standard are provided with unique MAC addresses that are set by the respective makers. Moreover, this MAC address is recorded in an IC chip in the LAN communication circuit and can be read using a function of the OS of a client computer if necessary. Thus by using the MAC address as the identification code, all client computers can be distinguished from each other. In this case, the MAC address of the LAN communication circuit incorporated in client computer 11 is recorded as identification code ID(11) in portable information recording medium R11, which is issued as the employee ID card of user α.

Needless to say, the code that can be used as the identification code in this invention is not restricted to the MAC address and any code may be used as the identification code in the same manner as the MAC address as long as it is unique data stored in a storage device of a client computer. For example, if each individual client computer is provided with a unique serial number and if this serial number is recorded in some form inside each client computer, this serial number may be used as the identification code. Or, a unique serial number may be written intentionally into a specific area of a hard disk of each client computer and used as the identification code.

Information indicating the arrangement of application programs stored in the storage device of each client computer may also be used as the unique identification code for identifying the client computer. Normally, each client computer has predetermined application programs installed therein according to business, and the fact that specific application programs are installed may be used as the identification code. Actually, since in many cases there are a plurality of computers having the same types of application programs installed, in such a case, serial numbers that are input in installing the application programs may be used as information indicating the arrangement of the application programs and thus as the identification code. That is, in many cases with a general application program, the input of a predetermined serial number is required in the installation process and the serial number that is input is recorded in the hard disk device, etc. Individual client computers can thus be distinguished from each other using the application program serial numbers as the identification code.

When the preparation step of recording the identification code of a specific computer in each of portable information recording media R11, R12, and R21 issued to users α, β, and γ, respectively is completed as shown in FIG. 2, operation of this computer system can be started. With this computer system, when a user uses the client computer supplied to the user, the user is required to perform a task of connecting the IC card issued as the employee ID card, that is, the portable information recording medium to the client computer. For example, in using client computer 11 on his/her own desk, user α must connect portable information recording medium R11, which is the IC card that has been issued as the employee ID card, to client computer 11 and perform a predetermined usage starting procedure (a procedure that is generally referred to as a login procedure or logon procedure). Thus in the present embodiment, each client computer has a reader/writer device for IC cards.

The basic principle of security management in this embodiment's computer system lies in the point that when a user connects a predetermined portable information recording medium, issued to the user him/herself, to a predetermined client computer and performs the login procedure on the predetermined client computer, the identification code recorded in the predetermined client computer is compared with the identification code recorded in the predetermined portable information recording medium and a predetermined access right is set based on the comparison result. More specifically, when the comparison result indicates mismatching, an access right with more restrictions than in the case where the comparison result indicates matching are set.

With the example shown in FIG. 2, when user α connects portable information recording medium R11, which has been issued as user α's own employee ID card, to client computer 11, which is installed in personnel department 10 and is the computer that user α is to use primarily, and performs the login procedure, a task of comparing identification code ID(11), recorded in client computer 11, with identification code ID(11), recorded in portable information recording medium R11, is performed. Access rights are then set based on the comparison result. With this example, since the comparison result indicates matching, the primary access right set for user α are provided in response to the act of access by user a using client computer 11. For example, user α is provided the access right enabling the reading of general business data in server computer 110 and the access right of enabling the reading and writing of personnel-department-exclusive business data in server computer 120.

The case where user α performs access using client computer 21, installed in lounge 20, shall now be considered. In this case, although user α performs the login procedure upon connecting portable information recording medium R11 to client computer 21, since identification code ID(21), recorded in client computer 21, does not match identification code ID(11), recorded in portable information recording medium R11, an access right with more restrictions is set in comparison to the case where the comparison result indicates matching. For example, an access right is provided that enable reading of general business data in server computer 110 but prohibit any access to personnel-department-exclusive business data in server computer 120.

When such operation is carried out, although a user will be provided with the primary access right when using a predetermined primary client computer, the access right of the user will be restricted when the user uses a client computer other than the primary client computer. With the above example, although user α is enabled to access the respective server computers using the primary access right provided to personnel department staff as long as he/she works on client computer 11 that is installed in personnel department 10, when user α uses a client computer installed in lounge 20 or company dormitory 30, he/she cannot acquire his/her primary access right. The security issues described in Section 0 can thus be resolved.

Figure 3:
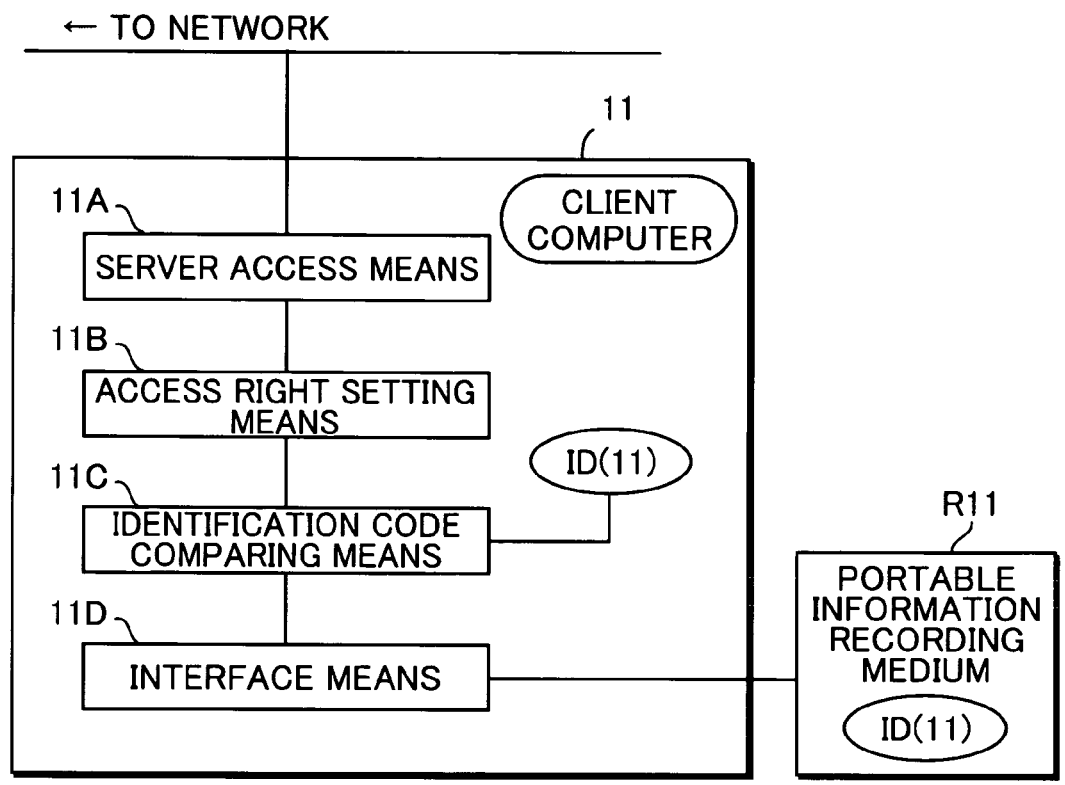
FIG. 3 is a block diagram of the arrangement of a client computer for implementing the first embodiment shown in FIG. 2.

In order to perform the identification code comparison process and the access right setting process according to the comparison result, corresponding components must be prepared inside a client computer. FIG. 3 is a block diagram of the arrangement of client computer 11 for implementing the first embodiment. As illustrated, client computer 11 has a server access means 11A, an access right setting means 11B, an identification code comparing means 11C, and an interface means 11D. Although obviously besides these, various components for realizing functions as a client computer (for example, a CPU, memory, hard disk, input/output device, etc., for executing an OS program and application programs) are equipped, description thereof shall be omitted here.

As mentioned above, this client computer 11 has recorded therein the unique identification code ID(11) that enables it to be distinguished from other client computers. If for example, the MAC address is to be used as identification code ID(11), since identification code ID(11) will then incorporated in client computer 11 from the beginning, a task of writing an identification code into client computer 11 will be absolutely unnecessary. Meanwhile, identification code ID(11) is also recorded in portable information recording medium R11, and for this, a writing task must be performed by a manager of the computer system. Although in the example shown here, portable information recording medium R11 is an IC card that is issued as the employee ID card of user α and thus numerous data besides identification code ID(11) are recorded therein, description of these other data shall be omitted.

Here, interface means 11D is a component for connecting portable information recording medium R11 and, with the present example, is arranged from a reader/writer device for IC cards. In performing the login procedure on client computer 11, the user installs portable information recording medium R11, which is an IC card, in interface means 11D, which is a reader/writer device, and can thereby put the two components in a connected state. In ending use, the two components can be separated from each other by drawing the IC card out of the reader/writer device.

Identification code comparing means 11C is a component having a function of comparing the identification code recorded in the presently connected portable information recording medium and the identification code recorded in itself, and access right setting means 11B is a component having a function of setting a predetermined access right based on the comparison result. When the comparison result indicates matching, access right setting means 11B sets a first access right and when the comparison result indicates mismatching, access right setting means 11B sets a second access right with more restrictions than the first access right. Server access means 11A is a component that performs access to server computers 110 and 120 within the range of the access right that has been set.

In the case of the illustrated example, since user α uses portable information recording medium R11, which is his/her own employee ID card, to perform the login procedure on client computer 11, the result of comparison by identification code comparing means 11C will indicate matching. That is, since identification code comparing means 11C performs a process of comparing identification code ID(11) in portable information recording medium R11 that has been read via interface means 11D and identification code ID(11) recorded in client computer 11, a result indicating that the two are matched is obtained in this example and access right setting means 11B thus sets the first access right.

If the same login procedure is carried out on client computer 21 installed in lounge 20, since identification code ID(11) in portable information recording medium R11 and identification code ID(21) recorded in client computer 21 are not matched, identification code comparing means 21C in client computer 21 will indicate a mismatching result and access right setting means 21B will set the second access right.

In the above example, a right enabling the reading of general business data in server computer 110 and enabling the reading and writing of personnel-department-exclusive business data in server computer 120 is set as the first access right, and a right enabling the reading of general business data in server computer 110 but prohibiting any access to data in server computer 120 is set as the second access right.

The setting of such specific contents of allowing/disallowing access does not necessarily have to be carried out by the access right setting means in the client computer. Indeed for practical use, it is more preferable for the access right setting means to just select between either the first access right or the second access right and for the details of the allowing/disallowing of access to be set at the server computer side. For example, settings are made so that in regard to the personnel-department-exclusive business data in server computer 120, reading and writing are enabled if access is made by user α with the first access right and any access is rejected if access is made by user α with the second access right. In this case, the verification that the access is made by user α can be made by comparison of the account name and the password provided to user α.

The identification code comparison process and the process of setting access right according to the comparison result do not necessarily have to be carried out at the client computer side. That is, if the portable information recording medium has an information processing function, these processes may be carried out at the portable information recording medium side. Presently, IC cards that are used as employee ID cards have not just the function of a simple information recording medium but are also equipped with functions as an information processing device having a CPU incorporated therein. By using such a portable information recording medium equipped with information processing functions (referred to hereinafter as a portable information processing device), the identification code comparison process and the access right setting process can be carried out at the portable information processing device side.

Figure 4:
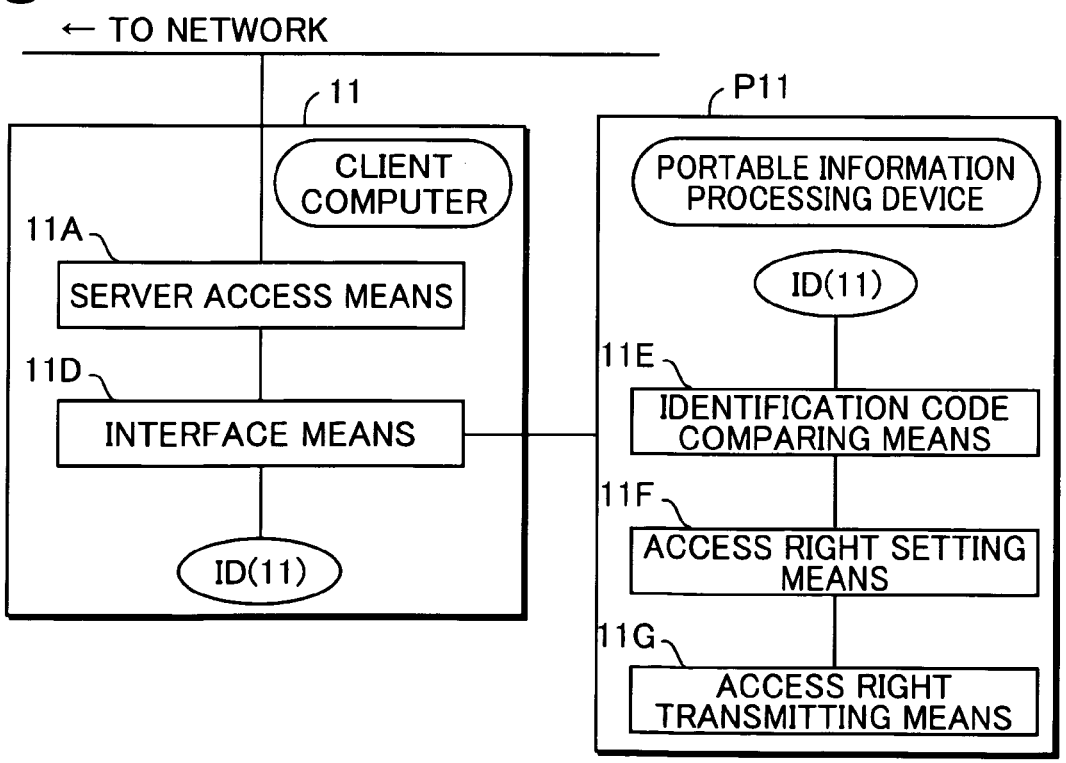
FIG. 4 is a block diagram of the arrangement of a modification example of the first embodiment shown in FIG. 2, wherein a comparison process and an access right setting process are executed at a portable information processing device.

FIG. 4 is a block diagram of the arrangement of a modification example of the first embodiment, wherein the comparison process and the access right setting process are executed at a portable information processing device. As illustrated, besides the point that the unique identification code ID(11) is recorded in client computer 11 and identification code ID(11), corresponding to the identification code recorded in client computer 11, is recorded in a portable information processing device P11, the arrangement is exactly the same as that of the example shown in FIG. 3. However, although client computer 11 has server access means 11A, which performs access to server computers within the range of an access right transmitted from the currently connected portable information processing device, and interface means 11D, for connecting the portable information processing device, it is not equipped with an identification code comparing means and an access right setting means.

Meanwhile, portable information processing device P11 is an IC card with information processing functions as mentioned above and, as illustrated, has an identification code comparing means 11E, an access right setting means 11F, and an access right transmitting means 11G. Identification code comparing means 11E is a component that compares the identification code recorded in the currently connected client computer and the identification code recorded in itself, access right setting means 11F is a component that sets a predetermined access right based on the comparison result, and access right transmitting means 11G is a component that transmits the set access right to the currently connected client computer.

As illustrated, when user α uses portable information processing device P11 (IC card with information processing functions), which is user α's own employee ID card, to perform the login procedure on client computer 11, identification code comparing means 11E performs the process of comparing identification code ID(11) in client computer 11 that is read via interface means 11D and identification code ID(11) recorded in portable information processing device P11. Since a result indicating matching of the two codes is obtained in this example, access right setting means 11F sets the first access right and the set access right is transmitted via interface means 11D to server access means 11A. As a result, server access means 11A performs access to the server computers based on the first access right.

As a matter of course, when the same login procedure is carried out on client computer 21 installed in lounge 20, since identification code ID(11) in portable information processing device P11 does not match identification code ID(21) recorded in client computer 21, a mismatching comparison result is obtained at identification code comparing means 11E and access right setting means 11F sets the second access right. As a result, server access means 11A performs access to the server computers based on the second access right.

Section 2

Second Embodiment of this Invention

Figure 5:
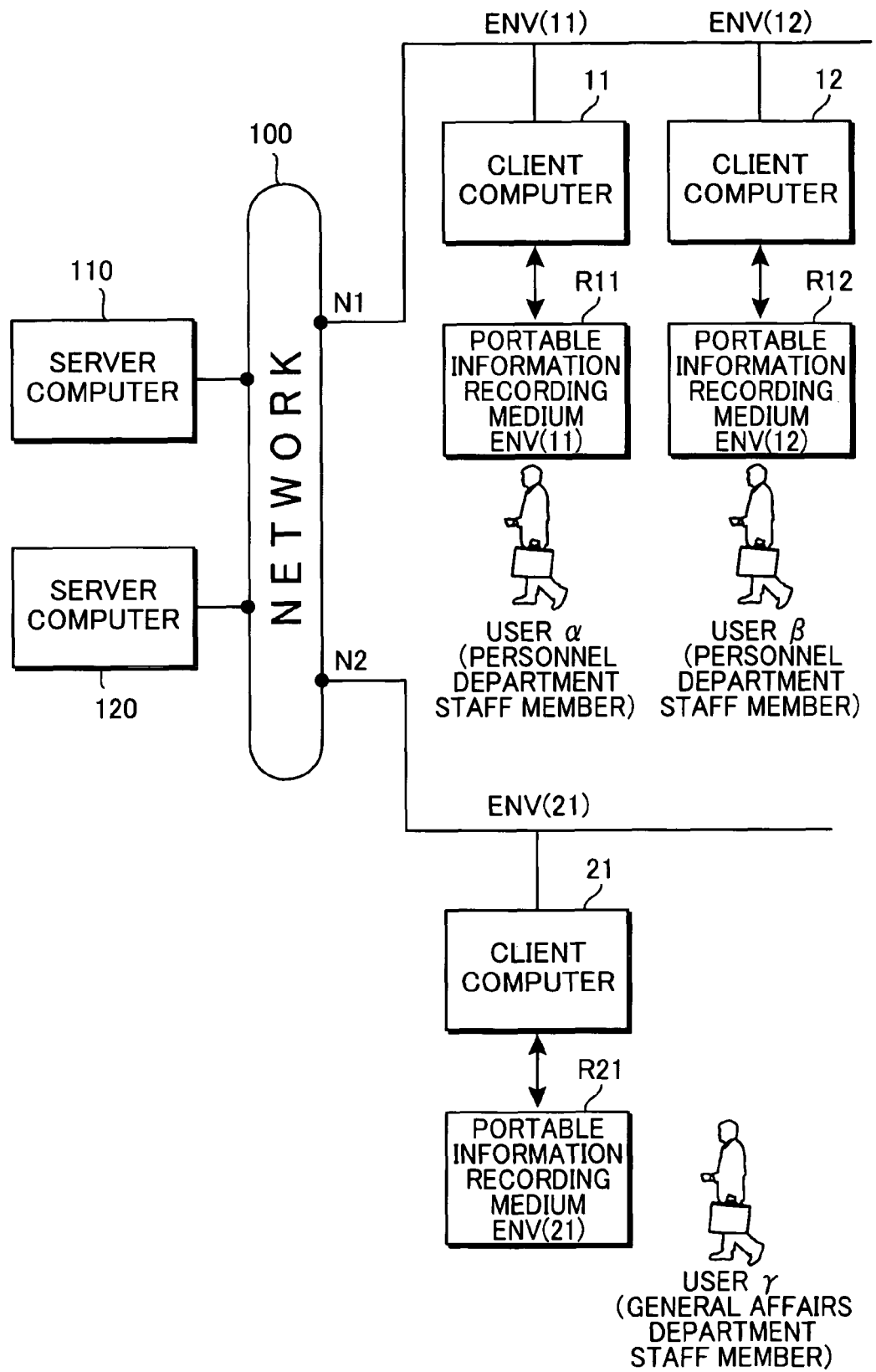
FIG. 5 is a block diagram for describing a second embodiment of this invention and shows a portion of the computer system shown in FIG. 1.

FIG. 5 is a block diagram for describing a second embodiment of this invention and shows a portion of the computer system shown in FIG. 1. A basic concept of this second embodiment is a form of operation, wherein instead of establishing a primary client computer, a primary network environment is established for each individual user, and whereas access according to the primary access right set for a user is enabled when a user performs access using a client computer connected with the primary network environment, only access according to an access right with more restrictions than the primary access right set for the user is enabled when the user performs access using a client computer connected with a network environment besides the primary network environment.

That is, whereas with the first embodiment described above, the access right was set according to whether or not each user is accessing from a specific client computer that has been established in advance, with this second embodiment, the access right is set according to whether or not each user is accessing from a specific network environment that has been established in advance. Here, "network environment" refers to the environment that is obtained when a client computer is connected to a specific location of network 100, and with the example shown in FIG. 1, client computers 11 to 14, which perform access to server computers 110 and 120 via node N1 of network 100, client computers 21 to 23, which perform access to server computers 110 and 120 via node N2, and computer 31, which performs access to server computers 110 and 120 via node N3, are the computer groups that differ in network environment.

The network environment strictly indicates the environment of connection to network 100 and is not directly relevant to the individual client computers. For example, if client computer 23, which is installed in lounge 20 as shown in FIG. 1, is disconnected from the LAN in lounge 20, moved to personnel department 10, and connected to the LAN in personnel department 10, the network environment will be changed even with the same client computer 23. Oppositely, when client computer 11 installed in personnel department 10 malfunctions and is replaced a new client computer 15 at the same installation location, although the client computer itself is different, the network environment is not changed.

With the above-described first embodiment, when the MAC address unique to each individual client computer is used as the identification code, the identification code will change when the computer is replaced by a new unit. In this case, a task of newly rewriting the identification code recorded in the portable information recording medium is necessary. With the second embodiment described here, since the access right is set upon judging not the sameness of the client computer itself but the sameness of the network environment, as long as the sameness of the network environment is secured, a task of rewriting the contents recorded in the portable information recording medium is not necessary even if a computer is replaced.

An example, wherein portable information recording media R11, R12, and R21 are issued to the three users α, β, and γ, respectively, based on the second embodiment is shown in FIG. 5. As mentioned above, these portable information recording media R11, R12, and R21 are employee ID cards arranged from IC cards that are issued to users α, β, and γ respectively.

In the second embodiment, environment information, indicating the specific network environment that is obtained when a client computer is connected to a specific location of network 100, is recorded in each of information recording media R11, R12, and R13. The environment information that is recorded here indicates the primary network environment that each user is to use. With the example shown in FIG. 5, environment information ENV(11), which indicates the network environment that user α is to use primarily, is recorded in portable information recording medium R11 issued to user α (the IC card issued as the employee ID card of user α). Specifically, environment information ENV(11) that indicates the network environment concerning client computer 11 that user a uses at his/her desk is recorded as it is in portable information recording medium R11. Likewise, environment information ENV(12) that indicates the network environment, which user β is to use primarily is recorded in portable information recording medium R12 issued to user β (the IC card issued as the employee ID card of user β), and environment information ENV(21) that indicates the network environment, which user γ is to use primarily is recorded in portable information recording medium R21 issued to user γ (the IC card issued as the employee ID card of user γ).

As the environment information that indicates the network environment, any information may be used as long as the information indicates the specific network environment that is obtained when a client computer is connected to a specific location of network 100. Some specific examples of information that can be used as the environment information shall now be described.

For example, an IP address that is provided to a client computer can be used as the environment information. Normally, a predetermined IP address is automatically allocated using a DHCP (Dynamic Host Configuration Protocol) to a computer that makes up a computer system of a company. If a form of operation, wherein a predetermined address range is established for each network area, is implemented, the range of the allocated addresses will differ according to the location of connection to network 100. With the example shown in FIG. 1, if routers are disposed respectively at nodes N1, N2, and N3 of network 100 and IP addresses belonging to a first address range are allocated to client computers 11, 12, 13, and 14 of personnel department 10 that are connected to node N1, IP addresses belonging to a second address range are allocated to client computers 21, 22, and 23 of lounge 20 that are connected to node N2, and an IP address belonging to a third address range is allocated to client computer 31 of company dormitory 30 that is connected to node N3, the network environment of a client computer can be recognized by checking to which address range the IP address, currently allocated to that client computer, belongs.

For example, if the IP address allocated to a client computer belongs to the first address range, it can be recognized that this client computer is a computer of personnel department 10 that is connected to node N1. In the case of IPv4, IP addresses are expressed by 32-bit numerals, and for example, if IP addresses are determined under a rule such that client computers connected to the same node are provided with IP addresses that are the same in the upper 24 bits and differ in just the lower 8 bits, the upper 24 bits of the IP address can be used as they are as the environment information that indicates the network environment. With the example shown in FIG. 1, since the upper 24 bits of the respective IP addresses of client computers 11, 12, 13, and 14 belonging to personnel department 10 will be the same, these can be used as they are as the environment information.

A default gateway address that is set for a client computer can also be used as the environment information that indicates the network environment. With the example shown in FIG. 1, if routers are installed for nodes N1, N2, and N3, respectively, the default gateway address set for each client computer will be the IP address of the router that is installed at the corresponding node. For example, for client computers 11, 12, 13, and 14 of personnel department 10, the IP address of the router installed at node N1 is set as the common default gateway address. Meanwhile, for client computers 21, 22, and 23 of lounge 20, the IP address of the router installed at node N2 is set as the common default gateway address. These default gateway addresses can thus be used as they are as the environment information indicating the network environments.

In the case where not routers but proxy servers are installed at nodes N1, N2, and N3, a proxy server address that is set for a client computer may be used as the environment information that indicates the network environment. Whereas a common proxy server address will be set for client computers 11, 12, 13, and 14 of personnel department 10, a different common proxy server address will be set for client computers 21, 22, and 23 of lounge 20.

Besides the above, a domain name that can be referenced by a DNS server that is used by a client computer can also be used as the environment information that indicates the network environment of the client computer. A DNS server is a server computer with a conversion table function for mutual conversion among domain names and IP addresses. With the example shown in FIG. 1, if the DNS server referenced by the respective client computers installed in personnel department 10 differs from the DNS server referenced by the respective client computers installed in lounge 20 and the contents of the conversion tables in the respective DNS servers differ, these differences can be used to recognize to which group of client computers referencing a certain DNS server a client computer belongs.

For example, if a table that converts a domain name, "Melon," to an IP address is prepared in the DNS server referenced by the respective client computers installed in personnel department 10 and the table that converts the domain name, "Melon," to an IP address is not prepared in the DNS server referenced by the respective client computers installed in lounge 20, when an operation of searching for the domain name, "Melon," is performed from a client computer and this domain name is found, it can be recognized that this client computer is a client computer that is installed in personnel department 10.

As described above, any of various information that indicate the specific network environment that is obtained when a client computer is connected to a specific location of network 100 can be used as the environment information in the second embodiment. Here, suppose that a preparation step of recording specific environment information in each of portable information recording media R11, R12, and R21 issued to users α, β, and γ, respectively as shown in FIG. 5 has been completed. For example, environment information ENV(11) that is recorded in portable information recording medium R11 is information that indicates the primary network environment that user a uses and may be the upper 24 bits of the IP address provided to client computer 11, the IP address (default gateway address) of the router installed at node N1, or the address of the proxy server installed at node N1.

With the example shown in FIG. 5, the network environment of client computer 11 and the network environment of client computer 12 are the same, and environment information ENV(11) and environment information ENV(12) will be the same. However, since the network environment of client computer 21 is different, environment information ENV(21) will differ form the above.

The basic principle of security management in this embodiment's computer system lies in the point that when a user connects a predetermined portable information recording medium, issued to the user him/herself, to a predetermined client computer and performs the login procedure on the predetermined client computer, the network environment of the client computer at the present point is compared with the network environment indicated by the environment information recorded in the predetermined portable information recording medium and predetermined access rights are set based on the comparison result. More specifically, when the comparison result indicates mismatching, an access right with more restrictions than in the case where the comparison result indicates matching is set. This point is the same as that of the first embodiment described above.

With the example shown in FIG. 5, when user a connects portable information recording medium R11, which has been issued as user α's own employee ID card, to client computer 11 of personnel department 10 and performs the login procedure, a task of comparing environment information ENV(11) that indicates the network environment of client computer 11 with environment information ENV(11) recorded in portable information recording medium R11 is performed. Access rights are then set based on the comparison result. With this example, since the comparison result indicates matching, the primary access right set for user α is provided in response to user α's act of access using client computer 11. For example, user α is provided the access right enabling the reading of general business data in server computer 110 and the access right enabling the reading and writing of personnel-department-exclusive business data in server computer 120.

With the example shown in FIG. 5, since the network environment of client computer 11 is the same as the network environment of client computer 12, environment information ENV(11) will be the same as environment information ENV(12). User a will thus be provided with the exactly same access right as that of the above-described case when he/she uses client computer 12. Needless to say, the same access right will be provided even when client computer 11 is exchanged with a new client computer 15 and this new client computer 15 is used. Thus operation of a higher degree of freedom is enabled with the second embodiment described here than with the above-described first embodiment.

The circumstances change when user a performs access using client computer 21, installed in lounge 20. In this case, although user α connects portable information recording medium R11 to client computer 21 and performs the login procedure, since environment information ENV(21) that indicates the network environment of client computer 21 does not match environment information ENV(11), recorded in portable information recording medium R11, an access right with more restrictions is set in comparison to the case where the comparison result indicates matching. For example, an access right is provided that enable reading of general business data in server computer 110 but prohibit any access to personnel-department-exclusive business data in server computer 120.

When such an operation is carried out, although a user will be provided with the primary access right as long as he/she performs access from a predetermined primary network environment, the access right of the user will be restricted when he/she performs access from a network environment besides the primary network environment. With the above example, although user α, who is a personnel department staff member, is enabled to access the respective server computers with the primary access right provided to personnel department staff as long as he/she performs access using any of client computers 11 to 14 that are installed in personnel department 10, when user a uses a client computer installed in lounge 20 or company dormitory 30, he/she cannot acquire his/her primary access right. The security issues described in Section 0 can thus be resolved.

Figure 6:
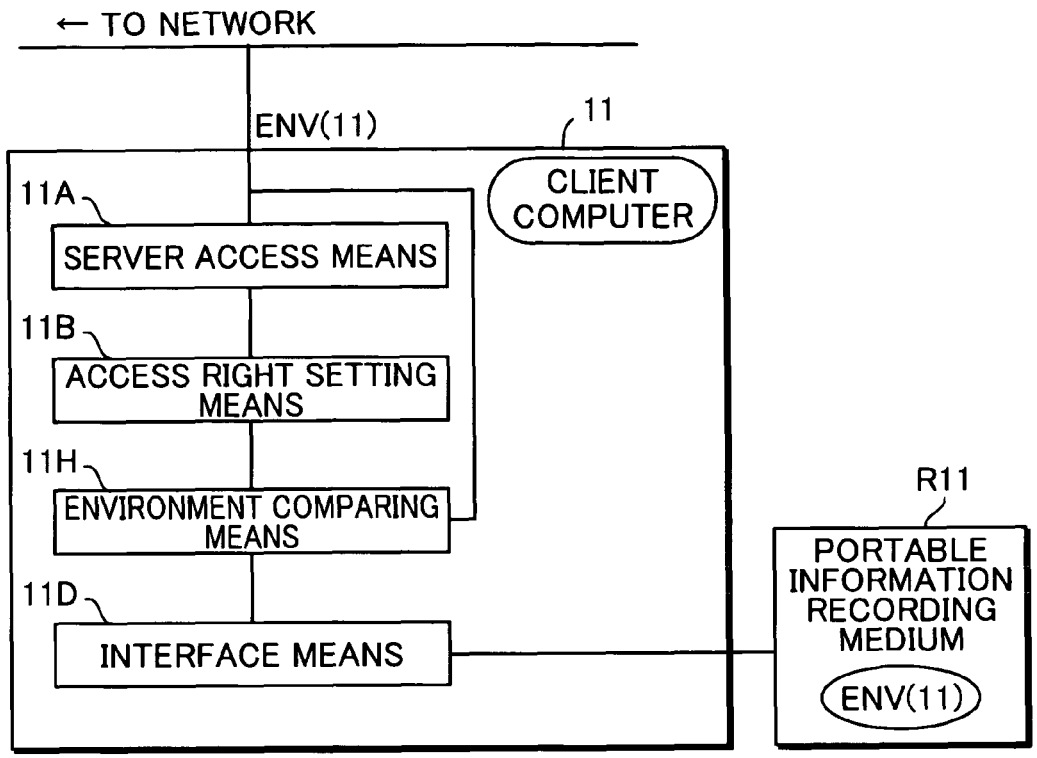
FIG. 6 is a block diagram of the arrangement of a client computer for implementing the second embodiment shown in FIG. 5.

Even with this second embodiment, in order to perform the environment information comparison process and the access right setting process according to the comparison result, corresponding components must be prepared in a client computer. FIG. 6 is a block diagram of the arrangement of client computer 11 for implementing the second embodiment. As illustrated, client computer 11 has server access means 11A, access right setting means 11B, environment comparing means 11H, and interface means 11D. Although obviously besides these, various components for realizing functions as a client computer (for example, a CPU, memory, hard disk, input/output device, etc., for executing an OS program and application programs) are equipped, description thereof shall be omitted here.

Client computer 11 is connected to network 100 under a specific network environment and this specific network environment can be indicated by the predetermined environment information ENV(11). As described above, the IP address, default gateway address, proxy server address, etc., can be used as environment information ENV(11).

As in the embodiment shown in FIG. 3, interface means 11D is the component for connecting portable information recording medium R11 and is arranged from a reader/writer device for IC cards. In performing the login procedure on client computer 11, the user installs portable information recording medium R11, which is an IC card, in interface means 11D, which is a reader/writer device, and can thereby put the two components in a connected state. In ending use, the two components can be separated from each other by drawing the IC card out of the reader/writer device.

Environment comparing means 11H is a component having a function of comparing the environment information, recorded in the presently connected portable information recording medium, and the environment information, indicating the current network environment of client computer 11, and access right setting means 11B is the component having the function of setting a predetermined access right based on the comparison result. When the comparison result indicates matching, access right setting means 11B sets the first access right and when the comparison result indicates mismatching, access right setting means 11B sets the second access right with more restrictions than the first access right. Server access means 11A is the component that performs access to server computers 110 and 120 within the range of the access right that has been set.

With the example shown in FIG. 6, since user α uses portable information recording medium R11, which is his/her own employee ID card, to perform the login procedure on client computer 11, the result of comparison by environment comparing means 11H will indicate matching. That is, since environment comparing means 11H performs a process of comparing environment information ENV(11) in portable information recording medium R11 that has been read via interface means 11D and environment information ENV(11) that indicates the current network environment of client computer 11, a result indicating that the two are matched is obtained in this example and access right setting means 11B thus sets the first access right.

If the same login procedure is carried out on client computer 21 installed in lounge 20, since environment information ENV(11) in portable information recording medium R11 and environment information ENV(21) indicating the network environment of client computer 21 are not matched, environment comparing means 21H in client computer 21 will indicate a mismatching result and access right setting means 21B will set the second access right. The difference between access under the first access right and access under the second access right is as has been described in Section 1.

Figure 7:
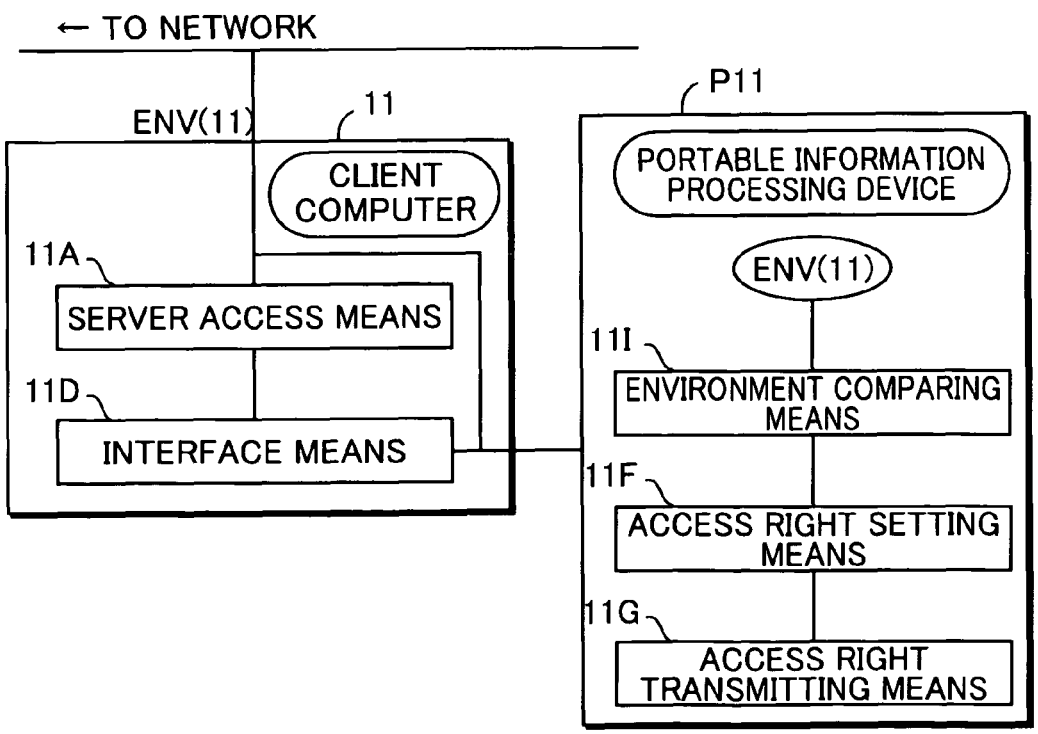
FIG. 7 is a block diagram of the arrangement of a modification example of the second embodiment shown in FIG. 5, wherein a comparison process and an access right setting process are executed at a portable information processing device.

FIG. 7 is a block diagram of the arrangement of a modification example of the second embodiment shown in FIG. 2, wherein the comparison process and the access right setting process are executed at a portable information processing device. As illustrated, although client computer 11 has server access means 11A, which performs access to server computers within the range of an access right transmitted from the currently connected portable information processing device, and interface means 11D, for connecting the portable information processing device, it is not equipped with an environment comparing means and an access right setting means.

Meanwhile, portable information processing device P11 is an IC card with information processing functions and, as illustrated, has an environment comparing means 11I, access right setting means 11F, and access right transmitting means 11G. Environment comparing means 11I is a component that compares the environment information indicating the network environment of the currently connected client computer and the environment information recorded in itself, access right setting means 11F is a component that sets a predetermined access right based on the comparison result, and access right transmitting means 11G is a component that transmits the set access right to the currently connected client computer.

As illustrated, when user a uses portable information processing device P11 (IC card with information processing functions), which is user α's own employee ID card, to perform the login procedure on client computer 11, environment comparing means 11I performs the process of comparing environment information ENV(11), which indicates the network environment of client computer 11 and is read via interface means 11D, and environment information ENV(11) recorded in portable information processing device P11. Since a result indicating matching of the two is obtained in this example, access right setting means 11F sets the first access right and the set access right is transmitted via interface means 11D to server access means 11A. As a result, server access means 11A performs access to the server computers based on the first access right.

Obviously when the same login procedure is carried out on client computer 21 installed in lounge 20, since environment information ENV(11) in portable information processing device P11 does not match environment information ENV(21) that indicates the network environment of client computer 21, a mismatching comparison result is obtained at environment comparing means 11I and access right setting means 11F sets the second access right. As a result, server access means 21A performs access to the server computers based on the second access right.

Section 3

Third Embodiment of this Invention

A third embodiment, which shall now be described, corresponds to being a combination of the first embodiment described in Section 1 and the second embodiment described in Section 2. That is, the characteristic of the first embodiment is that for each individual user, a specific client computer that the user is to use primarily is set and the access right setting is changed according to whether or not access is made from the primary client computer, and the characteristic of the second embodiment is that for each individual user, a specific network environment that the user is to use primarily is set and the access right setting is changed according to whether or not access is made from the primary network environment. A characteristic of the third embodiment is that for each individual user, a specific client computer that the user is to use primarily and a specific network environment that the user is to use primarily are set and the access right setting is changed in consideration of whether or not access is made from the primary client computer and whether or not access is made from the primary network environment.

Thus in the third embodiment, a specific identification code and an environment information indicating a specific network environment are recorded in a portable information recording medium that is issued to each individual user. When a user performs a login procedure on a client computer, a process of comparing the identification code recorded in the client computer and the identification code recorded in a portable information recording medium and a process of comparing the current network environment of the client computer and the network environment indicated by the environment information recorded in the portable information recording medium are carried out and predetermined access rights are set based on the comparison results.

Figure 8:
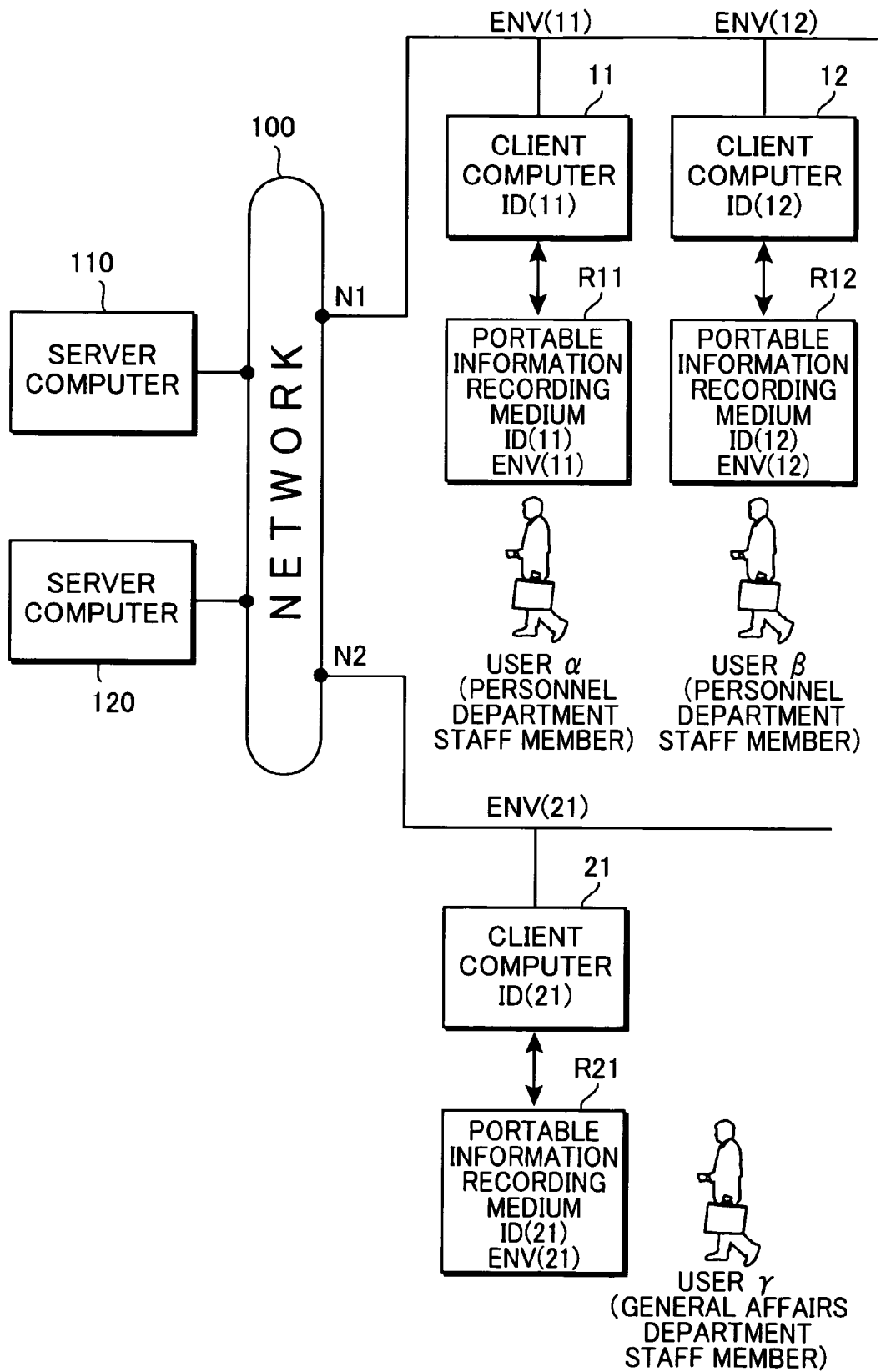
FIG. 8 is a block diagram for describing a third embodiment of this invention and shows a portion of the computer system shown in FIG. 1.

FIG. 8 is a block diagram for describing the third embodiment of this invention and shows a portion of the computer system shown in FIG. 1. An example, wherein portable information recording media R11, R12, and R21 are issued to the three users α, β, and γ, respectively, is illustrated here as well. In each of portable information recording media R11, R12, and R21 are recorded a predetermined identification code and a predetermined environment information. For example, identification code ID(11) of client computer 11, which user α is to use primarily, and environment information ENV(11), which indicates the network that user α is to use primarily, are recorded in portable information recording medium R11 issued to user α (the IC card issued as the employee ID card of user α). Likewise, identification code ID(12) of client computer 12, which user β is to use primarily, and environment information ENV(12), which indicates the network environment, which user β is to use primarily, are recorded in portable information recording medium R12 issued to user β (the IC card issued as the employee ID card of user β), and identification code ID(21) of client computer 21, which user γ is to use primarily, and environment information ENV(21), which indicates the network environment, which user γ is to use primarily, are recorded in portable information recording medium R21 issued to user γ (the IC card issued as the employee ID card of user γ).

With the example shown in FIG. 8, when, for example, user α connects portable information recording medium R11, which has been issued as user α's own employee ID card, to client computer 11 of personnel department 10 and performs the login procedure, a task of comparing identification code ID(11) in client computer 11 and identification code ID(11) recorded in portable information recording medium R11 and a task of comparing environment information ENV(11), which indicates the network environment of client computer 11, with environment information ENV(11), recorded in predetermined portable information recording medium R11, are performed. Access rights are then set based on the comparison results. With this example, both of the two comparison results will indicate matching.

If instead of client computer 11, user α performs the login procedure on client computer 12, a task of comparing identification code ID(12) in client computer 12 and identification code ID(11) recorded in portable information recording medium R11 and a task of comparing environment information ENV(12), which indicates the network environment of client computer 12, with environment information ENV(11), recorded in predetermined portable information recording medium R11, are performed. In this case, although the mismatching result, ID(11)≠ID(12), is obtained by the identification code comparison task, the matching result, ENV(11) =ENV(12), is obtained by the network environment comparison task.

Meanwhile, if user α performs access using client computer 21, installed in lounge 20, the mismatching result, ID(11)≠ID(21), is obtained in the identification code comparison task and the mismatching result, ENV(11)≠ENV(21), is obtained in the network environment comparison task as well. If user α performs access by moving client computer 11, installed in personnel department 10, to lounge 20 and connecting client computer 11 to the LAN in lounge 20, although the matching result, ID(11)=ID(11), is obtained in the identification code comparison task, the mismatching result, ENV (11)≠ENV(12), is obtained in the network environment comparison task.

Thus by combining the identification code comparison task and the network environment comparison task, a total of four combinations of comparison results are obtained, thus enabling a variation of four types of access right setting.

Figure 9:
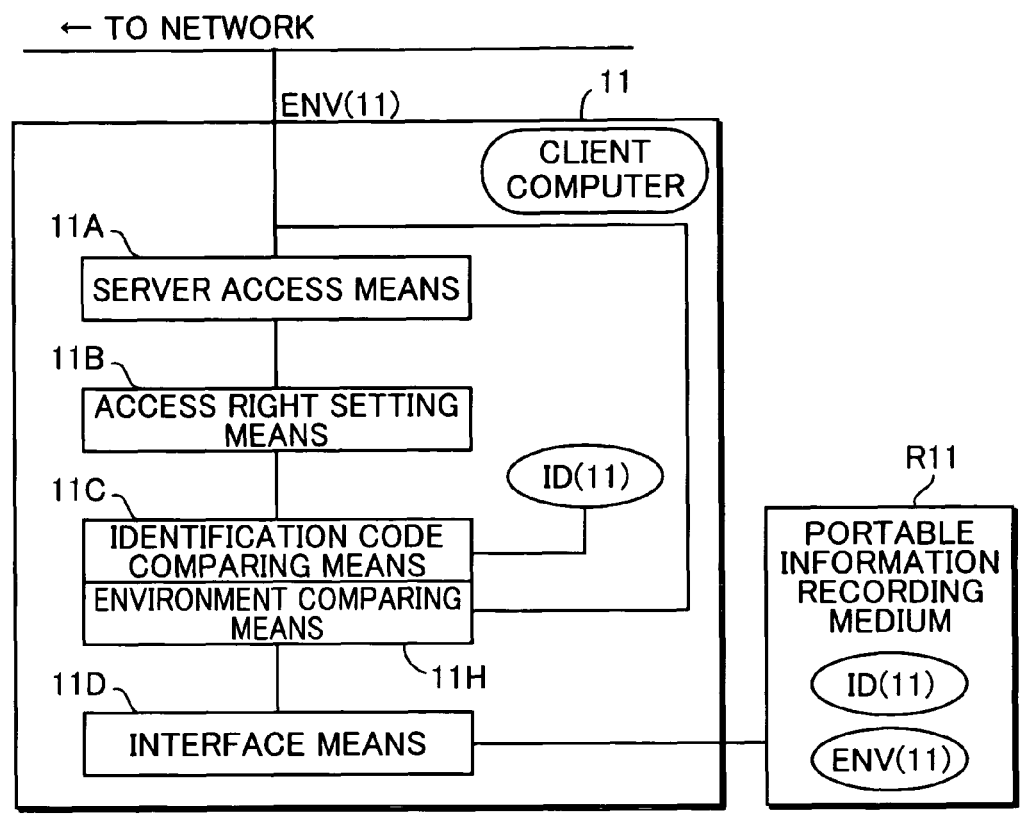
FIG. 9 is a block diagram of the arrangement of a client computer for implementing the third embodiment shown in FIG. 8.

FIG. 9 is a block diagram of the arrangement of client computer 11 for implementing the third embodiment that corresponds to being a synthesis of the arrangement of FIG. 3 and the arrangement of FIG. 6. Since the functions of the individual components are the same as those described in Section 1 and Section 2, the description of the functions of the respective components shall be omitted here. As illustrated, both identification code ID(11) and environment information ENV(11) are recorded in portable information recording medium R11. Also, both identification code comparing means 11C, which performs the identification comparison task, and environment comparing means 11H, which performs the network environment comparison, are disposed at client computer 11, and access right setting means 11B sets a predetermined access right based on the two comparison results.

Figure 10:
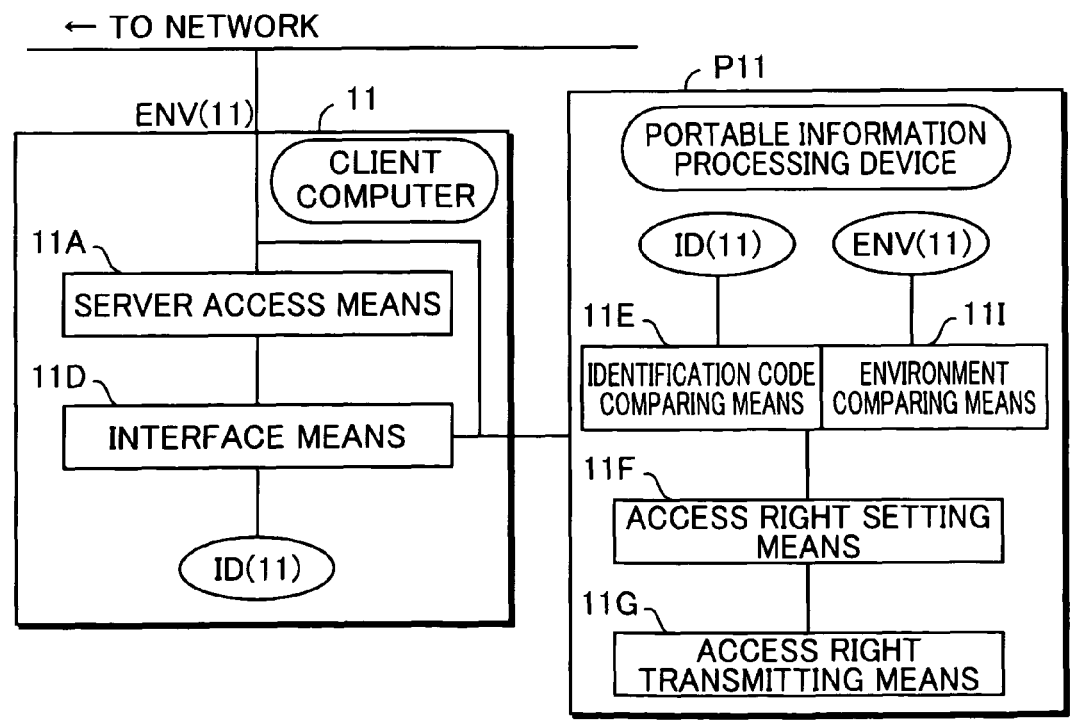
FIG. 10 is a block diagram of the arrangement of a modification example of the third embodiment shown in FIG. 8, wherein comparison processes and an access right setting process are executed at a portable information processing device.

FIG. 10 is a block diagram of the arrangement of a modification example of the third embodiment, wherein the comparison processes and the access right setting process are executed at a portable information processing device. The arrangement of this block diagram corresponds to being a synthesis of the arrangement of FIG. 4 and the arrangement of FIG. 7. Since the functions of the individual components are the same as those described in Section 1 and Section 2 here as well, the description of the functions of the respective components shall be omitted. As illustrated, portable information processing device P11 has both identification code ID(11) and environment information ENV(11) recorded therein and is provided with both identification code comparing means 11E, which performs the identification comparison task, and environment comparing means 11I, which performs the network environment comparison. Access right setting means 11F sets a predetermined access right based on the two comparison results.

Although as mentioned above, with the third embodiment, by combining the identification code comparison task and the network environment comparison task, a total of four combinations of comparison results are obtained to enabling a variation of four types of access right settings, in actuality, just three types of access right settings will suffice. Here, two practical access right setting algorithms that can be applied to a computer system that is used by many companies shall be described as examples.

A first algorithm is that of a method wherein, when the identification code comparison result indicates matching, the first access right is set regardless of the network environment comparison result, when the identification code comparison result indicates mismatching but the network environment comparison result indicates matching, the second access right, with more restrictions than the first access right, is set, and when neither of the comparison results indicates matching, the third access right, with even more restrictions than the second access right is set. With this method, access right management that is in line with the operation of an actual computer system is enabled.

Figure 11:
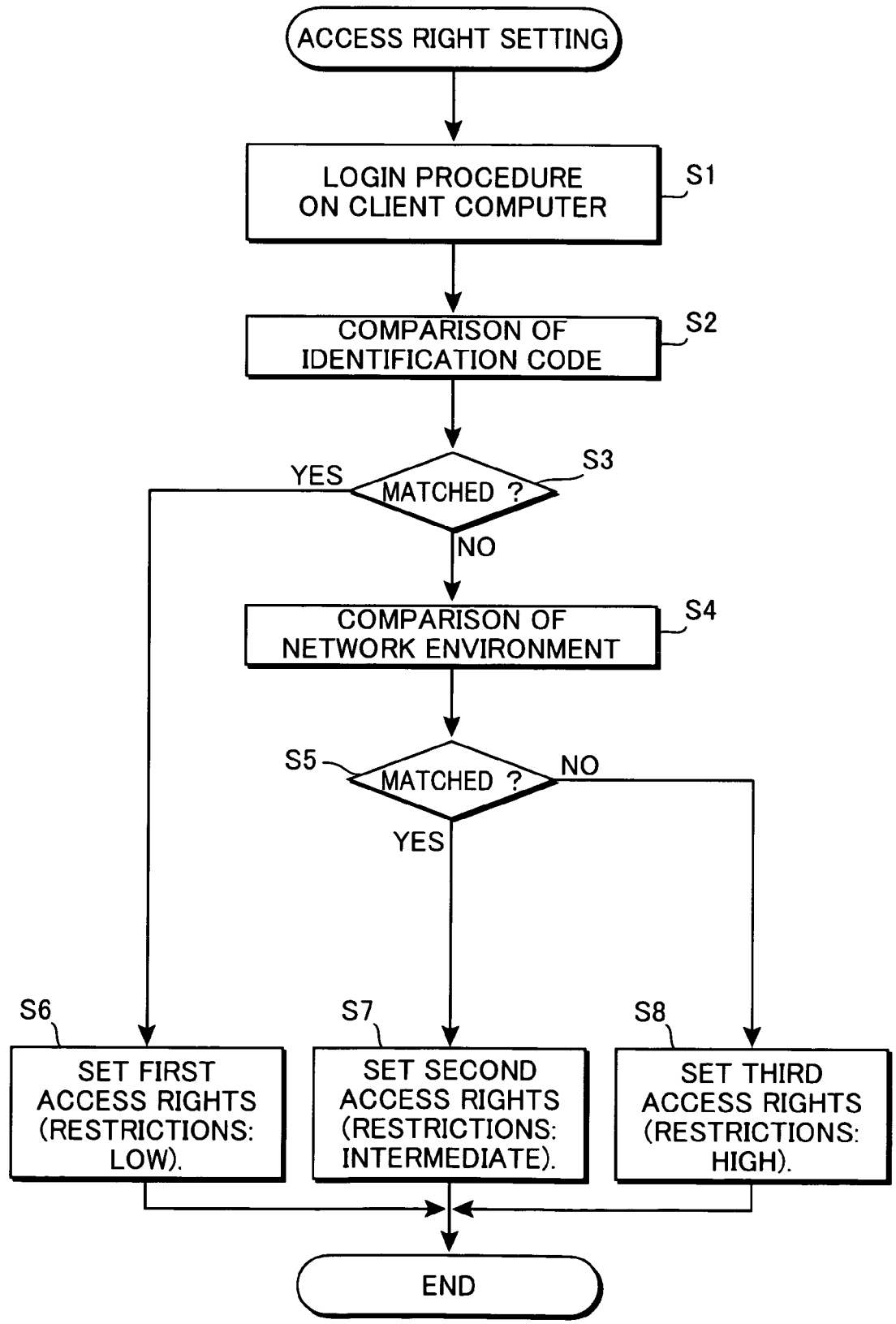
FIG. 11 is a flowchart of an example of the access right setting method of the third embodiment of this invention.

FIG. 11 is a flowchart of the access right setting method based on such a policy. First, when in step S1, a user performs the login procedure on a certain client computer, the identification code comparison task is performed in step S2. If the identification codes are matched here, branching to step S6 via step S3 is performed and the first access right, with a low amount of restrictions, is set. In this case, the network environment comparison task does not have to be performed. Meanwhile, if the identification codes are mismatched, step S4 is entered via step S3 and the network environment comparison task is performed. If the network environments are matched, branching to step S7 is performed via step S5 and the second access right, with an intermediate amount of restrictions, is set. If even the network environments are mismatched, branching to step S8 is performed via step S5 and the third access right, with a high amount of restrictions, is set.

Thus when access right setting is performed based on the algorithm shown in FIG. 11, as long as the user uses the primary client computer that has been supplied to him/her, the user is provided with the first access right of the highest level (the access right that is to be provided to the user primarily) regardless of which network environment the client computer is used in. Meanwhile, if the user performs access using a client computer besides the primary client computer, the user is provided with the second access right of the intermediate level if the access is made from the primary network environment and is provided with the third access right of the lowest level if the access is made from a network environment besides the primary network environment.

Meanwhile, a second algorithm is that of a method wherein, when both the result of comparison by the identification code comparing means and the result of comparison by the environment comparing means indicate matching, the first access right is set, when the result of comparison by the identification code comparing means indicates matching but the result of comparison by the environment comparing means indicates mismatching, the second access right, with more restrictions than the first access right, is set, and when neither of the comparison results indicates matching, the third access right, with even more restrictions than the second access right is set. Access right management that is in line with the operation of an actual computer system is enabled with this method as well.

Figure 12:
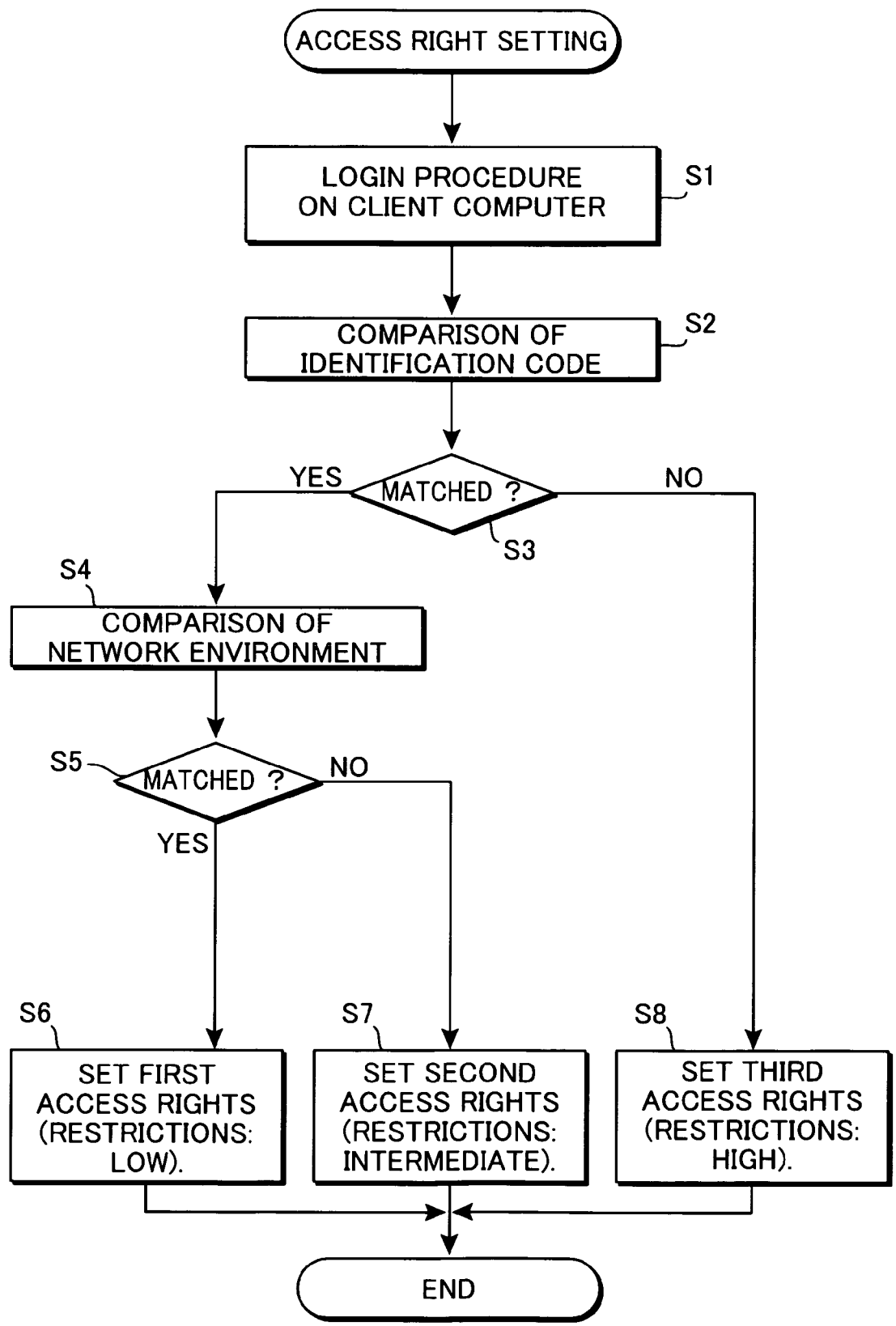
FIG. 12 is a flowchart of another example of the access right setting method of the third embodiment of this invention.

FIG. 12 is a flowchart of the access right setting method based on such a policy. First, when in step S1, a user performs a login procedure on a certain client computer, the identification code comparison task is performed in step S2. If the identification codes are matched here, branching to step S4 via step S3 is performed and the network environment comparison task is performed. If the network environments are also matched, branching to step S6 is performed via step S5 and the first access right, with a low amount of restrictions, is set. If the network environments are mismatched, branching to step S7 is performed via step S5 and the second access right, with an intermediate amount of restrictions, is set. If the identification codes are mismatched, branching to step S8 is performed from step S3 and the third access right, with a high amount of restrictions, is set. In this case, the network environment comparison task does not have to be performed.

Thus when access right setting is performed based on the algorithm shown in FIG. 12, as long as the user uses the primary client computer that has been supplied to him/her in the primary network environment, he/she is provided with the first access right of the highest level (the access right that is to be provided to the user primarily). Meanwhile, if the user performs access using the primary client computer that has been supplied to him/her but from a network environment that differs from the primary network environment, the user is provided with the second access right of the intermediate level. If the user uses another client computer that is not the primary client computer that has been supplied to him/her, the user is provided with the access right of the lowest level regardless of the network environment.

Although examples of two types of access right setting algorithm that can be used with the third embodiment were described above, the access right settings of this invention may obviously be arranged freely to suit each individual computer system and are not restricted to the above-described examples. For example, four types of access right settings may be made based on four types of comparison results.

Section 4

Some Modification Examples

Although this invention has been described above using three basic embodiments, this invention is not restricted to these embodiments and may be put into practice in various other modes. Lastly, some modification examples of carrying out this invention shall be described.

(1) Although a characteristic point of this invention is that predetermined access rights are set based on the identification code comparison result or the network environment comparison result, obviously for practical use, combined use may be made with a conventionally practiced method of verifying a user by means of an account and a password and providing predetermined access rights that are set according to user.

(2) Although with the above examples, cases where a single identification code or a single environment information is recorded in the portable information recording medium were described, a plurality of identification codes or a plurality of network environments may be recorded and comparison may be performed for each of these. In this case, different access rights may be set according to which identification codes are matched or according to which network environments are matched. For example, two identification codes ID(11-1) and ID(11-2) may be recorded in portable information recording medium R11 issued to user α, and the first access right may be set when matching is achieved with identification code ID(11-1) and the second access right may be set when matching is achieved with identification code ID(11-2).

(3) Although with the above-described examples, cases where character strings, each indicating a code or address, are matched completely were described as examples of matching of identification codes or environment information, comparison matching in this invention does not necessarily signify cases where character strings, etc., are in complete one-to-one correspondence but signifies that client computer side information and portable information recording medium side information correspond in some form. For example, even if the client computer side information is A and the portable information recording medium side information is B, if these are in a relationship wherein information B is obtained unambiguously by applying a specific computing process on information A, since the correspondence of information A and information B can be confirmed by carrying out the specific computing process, comparison matching can be judged.

(4) In this invention, access rights include not only rights enabling reading and writing of files but also rights concerning various other processes such as the right to enable printout of file contents.

(5) In this invention, "server computer" refers widely to computers that provide data or services, and "client computer" refers widely to computers that receive data or services. Thus for example, if in the arrangement shown in FIG. 1, client computer 11 executes a process of transmitting data stored in client computer 14 via a network, client computer 14 functions as a "server computer" in regard to this process.

(6) Although in FIG. 3, FIG. 4, FIG. 6, FIG. 7, FIG. 9, and FIG. 10, the client computers, portable information processing devices, and other individual components are respectively indicated as blocks, in actuality, these blocks are components that are realized by programs incorporated in computers or IC cards. Needless to say, these programs can be recorded in and distributed by a CD-ROM or other computer readable recording medium.

INDUSTRIAL APPLICABILITY

This invention can be applied widely to systems that are used by connecting a plurality of computers that function as servers or clients to a network. This invention is particularly optimal for applications wherein a dedicated network, such as a LAN or WAN, is constructed in a company, servers with various functions are connected to this network, the servers are accessed by individual employees using personal computers, etc., and different access rights are set according to circumstances for each individual employee.

The invention claimed is:

1. A computer system comprising: a network (100); a server computer (110, 120) connected to the network; a plurality of client computers (11, 12, 21) connectable to the network; and portable information recording media (R11, R12, R21) issued respectively to individual users for use upon connection to the client computers; wherein a unique identification code (ID(11), ID(12), ID(21)) is recorded in each of the client computers (11, 12, 21) so as to enable distinction from other client computers, an identification code (ID(11), ID(12), ID(21)) that corresponds to a specific identification code recorded in a specific client computer is recorded in each of the portable information recording media (R11, R12, R21) issued to the individual users, and each of the client computers (11, 12, 21) comprises an interface means (11D) for connecting a portable information recording medium (R11, R12, R21), an identification code comparing means (11C) that compares an identification code recorded in a currently connected portable information recording medium (R11) and an identification code recorded in the client computers, an access right setting means (11B) that sets a predetermined access right based on a comparison result obtained by said identification code comparing means, and a server access means (11A) that performs access to the server computer within a range of the access right that has been set by said access right setting means.

2. A computer system comprising: a network (100); a server computer (110, 120) connected to the network; a plurality of client computers (11, 12, 21) connectable to the network; and portable information processing devices (P11) issued respectively to individual users for use upon connection to the client computers; wherein a unique identification code (ID(11), ID(12), ID(21)) is recorded in each of the client computers (11, 12, 21) so as to enable distinction from other client computers, an identification code (ID(11)) that corresponds to a specific identification code recorded in a specific client computer is recorded in each of the portable information processing devices (P11) issued to the individual users, each of the client computers (11, 12, 21) comprises an interface means (11D) for connecting a portable information processing device (P11), and a server access means (11A) that performs access to the server computer (110, 120) within a range of an access right that is set and transmitted from a currently connected portable information processing device (P11), and each of the portable information processing devices (P11) comprises an identification code comparing means (11E) that compares an identification code (ID(11)) recorded in a currently connected client computer (11) and an identification code (ID(11)) recorded in the portable information processing devices, an access right setting means (11F) that sets a predetermined access right based on a comparison result obtained by said identification code comparing means, and an access right transmitting means (11G) that transmits, to the currently connected client computer (11), the access right that has been set by said access right setting means.

3. The computer system according to claim 1, wherein the access right setting means (11B, 11F) sets a first access right when the comparison result indicates matching and sets a second access right, with more restrictions than the first access right, when the comparison result indicates mismatching.

4. The computer system according to claim 1, wherein a MAC address provided to a LAN communication circuit incorporated in a client computer (11, 12, 21), unique data stored in a storage device of the client computer (11, 12, 21), or information indicating an arrangement of application programs stored in a storage device of the client computer (11, 12, 21) is used as a unique identification code for identifying the client computer (11, 12, 21).

5. A computer system comprising: a network (100); a server computer (110, 120) connected to the network; a plurality of client computers (11, 12, 21) connectable to the network; and portable information recording media (R11, R12, R21) issued respectively to individual users for use upon connection to the client computers; wherein environment information (ENV(11), ENV(12), ENV(21)) that indicates a specific network environment that is obtained when a client computer (11, 12, 21) is connected to a specific location of the network (100) is recorded in each of the portable information recording media (R11, R12, R21) issued to the individual users, and each of the client computers (11, 12, 21) comprises an interface means (11D) for connecting a portable information recording medium (R11, R12, R21), an environment comparing means (11H) that compares a network environment indicated by environment information (ENV(11)) recorded in a currently connected portable information recording medium (R11) and a current network environment of the client computers, an access right setting means (11B) that sets a predetermined access right based on a comparison result obtained by said environment comparing means, and a server access means (11A) that performs access to the server computer within a range of the access right that has been set by said access right setting means.

6. A computer system comprising: a network (100); a server computer (110, 120) connected to the network; a plurality of client computers (11, 12, 21) connectable to the network; and portable information processing devices (P11) issued respectively to individual users for use upon connection to the client computers; wherein environment information that indicates a specific network environment that is obtained when a client computer (11, 12, 21) is connected to a specific location of the network (100) is recorded in each of the portable information processing devices (P11) issued to the individual users, each of the client computers (11, 12, 21) comprises an interface means (11D) for connecting a portable information processing device (P11), and a server access means (11A) that performs access to the server computer (110, 120) within a range of an access right that is set and transmitted from a currently connected portable information processing device (P11), and each of the portable information processing devices (P11) comprises an environment comparing means (11I) that compares a network environment of a currently connected client computer and a network environment indicated by environment information (ENV(11)) recorded in the portable information processing devices, an access right setting means (11F) that sets a predetermined access right based on a comparison result obtained by said environment comparing means, and an access right transmitting means (11G) that transmits, to the currently connected client computer (11), the access right that has been set by said access right setting means.

7. The computer system according to claim 5, wherein the access right setting means (11B, 11F) sets a first access right when the comparison result indicates matching and sets a second access right, with more restrictions than the first access right, when the comparison result indicates mismatching.

8. The computer system according to claim 5, wherein an IP address provided to a client computer (11, 12, 21), a default gateway address set for the client computer (11, 12, 21), a proxy server address set for the client computer (11, 12, 21), or a domain name which can be referred by a DNS server used by the client computer (11, 12, 21) is used as environment information that indicates a network environment of the client computer (11, 12, 21).

9. A computer system comprising: a network (100); a server computer (110, 120) connected to the network; a plurality of client computers (11, 12, 21) connectable to the network; and portable information recording media (R11, R12, R21) issued respectively to individual users for use upon connection to the client computers; wherein a unique identification code (ID(11), ID(12), ID(21)) is recorded in each of the client computers (11, 12, 21) so as to enable distinction from other client computers, an identification code (ID(11), ID(12), ID(21)) that corresponds to a specific identification code recorded in a specific client computer and environment information (ENV(11), ENV(12), ENV(21)) that indicates a specific network environment that is obtained when a client computer (11, 12, 21) is connected to a specific location of the network (100) are recorded in each of the portable information recording media (R11, R12, R21) issued to the individual users, and each of the client computers (11, 12, 21) comprises an interface means (11D) for connecting a portable information recording medium (R11, R12, R21), an identification code comparing means (11C) that compares an identification code (ID(11)) recorded in a currently connected portable information recording medium (R11) and an identification code (ID(11)) recorded in the client computers, an environment comparing means (11H) that compares a network environment indicated by environment information (ENV(11)) recorded in a currently connected portable information recording medium (R11) and a current network environment of the client computers, an access right setting means (11B) that sets a predetermined access right based on comparison results obtained by said identification code comparing means and said environment comparing means, and a server access means (11A) that performs access to the server computer within a range of the access right that has been set by said access right setting means.

10. A computer system comprising: a network (100); a server computer (110, 120) connected to the network; a plurality of client computers (11, 12, 21) connectable to the network; and portable information processing devices (P11) issued respectively to individual users for use upon connection to the client computers; wherein a unique identification code (ID(11), ID(12), ID(21)) is recorded in each of the client computers (11, 12, 21) so as to enable distinction from other client computers, an identification code (ID(11), ID(12), ID(21)) that corresponds to a specific identification code recorded in a specific client computer and environment information (ENV(11), ENV(12), ENV(21)) that indicates a specific network environment that is obtained when a client computer (11, 12, 21) is connected to a specific location of the network (100) are recorded in each of the portable information processing devices (P11) issued to the individual users, each of the client computers (11, 12, 21) comprises an interface means (11D) for connecting a portable information processing device (P11), and a server access means (11A) that performs access to the server computer (110, 120) within a range of an access right that is set and transmitted from a currently connected portable information processing device (P11), and each of the portable information processing devices (P11) comprises an identification code comparing means (11E) that compares an identification code (ID(11)) recorded in a currently connected client computer (11) and an identification code (ID(11)) recorded in the portable information processing devices, an environment comparing means (11I) that compares a network environment of the currently connected client computer and a network environment indicated by environment information (ENV(11)) recorded in the portable information processing devices, an access right setting means (11F) that sets a predetermined access right based on comparison results obtained by said identification code comparing means and said environment comparing means, and an access right transmitting means (11G) that transmits, to the currently connected client computer (11), the access right that has been set by said access right setting means.

11. The computer system according to claim 9, wherein the access right setting means (11B, 11F) sets a first access right when the result of comparison by the identification code comparing means (11, 11E) indicates matching, sets a second access right, with more restrictions than the first access right, when the result of comparison by the identification code comparing means (11C, 11E) indicates mismatching but the result of comparison by the environment comparing means (11H, 11I) indicates matching, and sets a third access right, with even more restrictions than the second access right, when neither of the comparison results indicates matching.

12. The computer system according to claim 9, wherein the access right setting means (11B, 11F) sets a first access right when both the result of comparison by the identification code comparing means (11C, 11E) and the result of comparison by the environment comparing means (11H, 11I) indicate matching, sets a second access right, with more restrictions than the first access right, when the result of comparison by the identification code comparing means (11C, 11E) indicates matching but the result of comparison by the environment comparing means (11H, 11I) indicates mismatching, and sets a third access right, with even more restrictions than the second access right, when neither of the comparison results indicates matching.

13. An access right setting method for a computer system comprising: a network (100); a server computer (110, 120) connected to the network; and a plurality of client computers (11, 12, 21) connectable to the network; the method setting an access right when each individual user uses a client computer to access the server computer and comprising:

a preparation step, wherein a portable information processing device (P11), to be used by connecting to a client computer (11, 12, 21), is issued to each individual user, and an identification code (ID(11)), corresponding to a unique identification code that is recorded in a specific client computer (11) and enables distinction of the specific client computer from other client computers, is recorded in the portable information processing device; and an access right setting step, wherein when a user connects a predetermined portable information processing device (P11), issued to him/herself, to a predetermined client computer (11) and performs a login procedure on the predetermined client computer, the predetermined client computer (11) or the predetermined portable information processing device (P11) carries out a first operation to compare an identification code (ID(11)) recorded in the predetermined client computer (11) with an identification code (ID(11)) recorded in the predetermined portable information processing device (P11) and a second operation to set a predetermined access right based on a comparison result obtained by the first operation;

wherein when in the access right setting step, the comparison result indicates mismatching, an access right with more restrictions than when the comparison result indicates matching is set.

14. An access right setting method for a computer system comprising: a network (100); a server computer (110, 120) connected to the network; and a plurality of client computers (11, 12, 21) connectable to the network; the method setting an access right when each individual user uses a client computer to access the server computer and comprising:

a preparation step, wherein a portable information processing device (P11), to be used by connecting to a client computer (11, 12, 21), is issued to each individual user, and environment information (ENV(11)) that indicates a specific network environment that is obtained when a client computer (11) is connected to a specific location of the network (100) is recorded in the portable information processing device; and an access right setting step, wherein when a user connects a predetermined portable information processing device (P11), issued to him/herself, to a predetermined client computer (11) and performs a login procedure on the predetermined client computer, the predetermined client computer (11) or the predetermined portable information processing device (P11) carries out a first operation to compare a current network environment of the predetermined client computer (11) with a network environment indicated by environment information (ENV(11)) recorded in the predetermined portable information processing device (P11) and a second operation to set a predetermined access right based on a comparison result obtained by the first operation;

wherein when in the access right setting step, the comparison result indicates mismatching, an access right with more restrictions than when the comparison result indicates matching is set.

15. An access right setting method for a computer system comprising: a network (100); a server computer (110, 120), connected to the network; and a plurality of client computers (11, 12, 21) connectable to the network; the method setting an access right when each individual user uses a client computer to access the server computer and comprising:

a preparation step, wherein a portable information processing device (P11), to be used by connecting to a client computer (11, 12, 21), is issued to each individual user, and an identification code (ID(11)), corresponding to a unique identification code that is recorded in a specific client computer (11) and enables distinction of the specific client computer from other client computers, and environment information (ENV(11)) that indicates a specific network environment that is obtained when a client computer (11) is connected to a specific location of the network (100) are recorded in the portable information processing device; and an access right setting step, wherein when a user connects a predetermined portable information processing device (P11), issued to him/herself, to a predetermined client computer (11) and performs a login procedure on the predetermined client computer, the predetermined client computer (11) or the predetermined portable information processing device (P11) carries out a first operation to compare an identification code (ID(11)) recorded in the predetermined client computer (11) with an identification code (ID(11)) recorded in the predetermined portable information processing device (P11), compare a current network environment of the predetermined client computer (11) with a network environment indicated by environment information (ENV(11)) recorded in the predetermined portable information processing device (P11), and a second operation to set a predetermined access right based on comparison results obtained by the first operation;

wherein in the access right setting step, if an identification code comparison result indicates matching, a first access right is set, if the identification code comparison result indicates mismatching but a network environment comparison result indicates matching, a second access right, with more restrictions than the first access right, is set, and if neither of the comparison results indicate matching, a third access right, with even more restrictions than the second access right, is set.

16. An access right setting method for a computer system comprising: a network (100); a server computer (110, 120), connected to the network; and a plurality of client computers (11, 12, 21) connectable to the network; the method setting an access right when each individual user uses a client computer to access the server computers and comprising:

a preparation step, wherein a portable information processing device (P11), to be used by connecting to a client computer (11, 12, 21), is issued to each individual user, and an identification code (ID(11)), corresponding to a unique identification code that is recorded in a specific client computer (11) and enables distinction of the specific client computer from other client computers, and environment information (ENV(11)) that indicates a specific network environment that is obtained when a client computer (11) is connected to a specific location of the network (100) are recorded in the portable information processing device; and an access right setting step, wherein when a user connects a predetermined portable information processing device (P11), issued to him/herself, to a predetermined client computer (11) and performs a login procedure on the predetermined client computer, the predetermined client computer (11) or the predetermined portable information processing device (P11) carries out a first operation to compare an identification code (ID(11)) recorded in the predetermined client computer (11) with an identification code (ID(11)) recorded in the predetermined portable information processing device (P11), compare a current network environment of the predetermined client computer (11) with a network environment indicated by environment information (ENV(11)) recorded in the predetermined portable information processing device (P11), a second operation to and set a predetermined access right based on comparison results obtained by the first operation;

wherein in the access right setting step, if both an identification code comparison result and a network environment comparison result indicate matching, a first access right is set, if the identification code comparison result indicates matching but the network environment comparison result indicates mismatching, a second access right, with more restrictions than the first access right, is set, and if neither of the comparison results indicate matching, a third access right, with even more restrictions than the second access right, is set.

17. A non-transitory computer-readable recording medium storing a program for making a computer function as a client computer in the computer system according to claim 1.

18. A non-transitory computer-readable recording medium storing a program for making a computer function as a client computer in the computer system according to claim 2.

19. A non-transitory computer-readable recording medium storing a program for making a computer function as a client computer in the computer system according to claim 5.

20. A non-transitory computer-readable recording medium storing a program for making a computer function as a client computer in the computer system according to claim 6.

21. A non-transitory computer-readable recording medium storing a program for making a computer function as a client computer in the computer system according to claim 9.

22. A non-transitory computer-readable recording medium storing a program for making a computer function as a client computer in the computer system according to claim 10.

23. The computer system according to claim 2, wherein the access right setting means (11B, 11F) sets a first access right when the comparison result indicates matching and sets a second access right, with more restrictions than the first access right, when the comparison result indicates mismatching.

24. The computer system according to claim 2, wherein a MAC address provided to a LAN communication circuit incorporated in a client computer (11, 12, 21), unique data stored in a storage device of the client computer (11, 12, 21), or information indicating an arrangement of application programs stored in a storage device of the client computer (11, 12, 21) is used as a unique identification code for identifying the client computer (11, 12, 21).

25. The computer system according to claim 6, wherein the access right setting means (11B, 11F) sets a first access right when the comparison result indicates matching and sets a second access right, with more restrictions than the first access right, when the comparison result indicates mismatching.

26. The computer system according to any one of claim 6, wherein
an IP address provided to a client computer (11, 12, 21), a default gateway address set for the client computer (11, 12, 21), a proxy server address set for the client computer (11, 12, 21), or a domain name which can be referred by a DNS server used by the client computer (11, 12, 21) is used as environment information that indicates a network environment of the client computer (11, 12, 21).

27. The computer system according to claim 10, wherein the access right setting means (11B, 11F) sets a first access right when the result of comparison by the identification code comparing means (11C, 11E) indicates matching, sets a second access right, with more restrictions than the first access right, when the result of comparison by the identification code comparing means (11C, 11E) indicates mismatching but the result of comparison by the environment comparing means (11H, 11I) indicates matching, and sets a third access right, with even more restrictions than the second access right, when neither of the comparison results indicates matching.

28. The computer system according to claim 10, wherein the access right setting means (11B, 11F) sets a first access right when both the result of comparison by the identification code comparing means (11C, 11E) and the result of comparison by the environment comparing means (11H, 11I) indicate matching, sets a second access right, with more restrictions than the first access right, when the result of comparison by the identification code comparing means (11C, 11E) indicates matching but the result of comparison by the environment comparing means (11H, 11I) indicates mismatching, and sets a third access right, with even more restrictions than the second access right, when neither of the comparison results indicates matching.

* * * * *